(12) United States Patent
Des Jardins et al.

(10) Patent No.: US 7,166,203 B2
(45) Date of Patent: Jan. 23, 2007

(54) CONTROLLED CONCENTRATION ELECTROLYSIS SYSTEM

(75) Inventors: Stephen R. Des Jardins, Encinitas, CA (US); Stuart I. Smedley, Escondido, CA (US)

(73) Assignee: Teck Cominco Metals Ltd., Vancouver (CA)

(*) Notice: Subject to any disclaimer, the term of this patent is extended or adjusted under 35 U.S.C. 154(b) by 435 days.

(21) Appl. No.: 10/660,469

(22) Filed: Sep. 10, 2003

(65) Prior Publication Data

US 2004/0108200 A1 Jun. 10, 2004

Related U.S. Application Data

(63) Continuation-in-part of application No. 10/424,539, filed on Apr. 24, 2003.

(60) Provisional application No. 60/410,590, filed on Sep. 12, 2002, provisional application No. 60/410,565, filed on Sep. 12, 2002, provisional application No. 60/410,548, filed on Sep. 12, 2002, provisional application No. 60/410,429, filed on Sep. 12, 2002, provisional application No. 60/410,426, filed on Sep. 12, 2002.

(51) Int. Cl.
*C25C 5/02* (2006.01)
*C25C 7/06* (2006.01)
*C25D 1/00* (2006.01)

(52) U.S. Cl. ............ 205/101; 205/602; 205/111; 205/112; 205/74

(58) Field of Classification Search .............. None
See application file for complete search history.

(56) References Cited

U.S. PATENT DOCUMENTS

| 923,411 | A | 6/1909 | Cowper-Coles |
|---|---|---|---|
| 1,397,008 | A | 11/1921 | McGall |
| 1,440,502 | A | 1/1923 | Slepian |
| 1,782,909 | A | 11/1930 | Pike |
| 3,414,486 | A | 12/1968 | Nordblom et al. |

(Continued)

Primary Examiner—Harry D Wilkins, III

(57) ABSTRACT

A system for maintaining a concentration range of an electroreducible metal species undergoing electrolysis within a predetermined concentration range comprises a first container containing a body of an electrolyte solution in which a metal is partially dissolved, a second container in fluid communication with the first container, the second container containing a second body of the solution, and a means for exchanging solution between the containers. The second container is configured with a means for electrolyzing, and a means for sensing the concentration of, the dissolved metal in the second body. During electrolysis, if the sensed concentration is within a predetermined range, the second body is circulated through the electrolyzing means; if the sensed concentration is outside or nearly outside the range, the solution is exchanged to maintain the concentration within the range. Optionally, the system includes a means for sensing temperature of the second body, and a means for maintaining the temperature within a predetermined range responsive to the sensed temperature by exchanging, cooling, or heating the solution comprising the second body. A method comprising these steps is also described.

28 Claims, 27 Drawing Sheets

U.S. PATENT DOCUMENTS

| | | | |
|---|---|---|---|
| 3,419,901 A | 12/1968 | Nordblom | |
| 3,577,330 A | 5/1971 | Knapp et al. | 204/112 |
| 3,860,509 A | 1/1975 | Emmett, Jr. | 204/281 |
| 3,879,218 A | 4/1975 | Kellen et al. | |
| 3,964,990 A | 6/1976 | Woyden et al. | |
| 4,014,756 A | 3/1977 | Fromson | 204/10 |
| 4,025,400 A | 5/1977 | Cook et al. | 204/10 |
| 4,028,199 A | 6/1977 | Holland | 204/10 |
| 4,134,800 A | 1/1979 | Samal et al. | 204/10 |
| 4,164,453 A | 8/1979 | Jacquelin | 204/10 |
| 4,676,877 A | 6/1987 | Castillo et al. | 204/10 |
| 4,724,051 A | 2/1988 | Sobieralski | 204/10 |
| 4,802,961 A | 2/1989 | Woog et al. | |
| 4,886,590 A | 12/1989 | Tittle | |
| 5,228,958 A * | 7/1993 | Goldstein et al. | 429/49 |
| 5,352,350 A * | 10/1994 | Andricacos et al. | 205/101 |
| 5,370,784 A | 12/1994 | Kammel et al. | 205/74 |
| 5,378,329 A * | 1/1995 | Goldstein et al. | 205/602 |
| 5,434,020 A | 7/1995 | Cooper | 429/210 |
| 5,451,298 A * | 9/1995 | Ueffinger | 205/335 |
| 5,462,647 A | 10/1995 | Bhattacharya et al. | 205/74 |
| 5,578,183 A | 11/1996 | Cooper | 205/64 |
| 5,695,629 A | 12/1997 | Nadkarni et al. | 205/348 |
| 5,792,328 A | 8/1998 | Givon | 204/226 |
| 5,958,210 A * | 9/1999 | Siu et al. | 205/602 |
| 6,024,856 A * | 2/2000 | Haydu et al. | 205/84 |
| 6,083,374 A * | 7/2000 | Kopp | 205/101 |
| 6,113,769 A * | 9/2000 | Uzoh et al. | 205/101 |
| 6,569,310 B2 * | 5/2003 | Bandlish et al. | 205/604 |
| 6,569,311 B2 * | 5/2003 | Bandlish et al. | 205/604 |
| 2004/0108213 A1 * | 6/2004 | Talasek et al. | 205/81 |

* cited by examiner

200

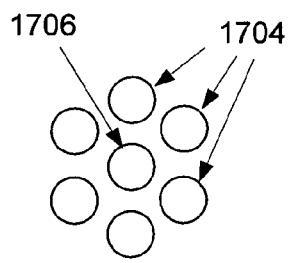
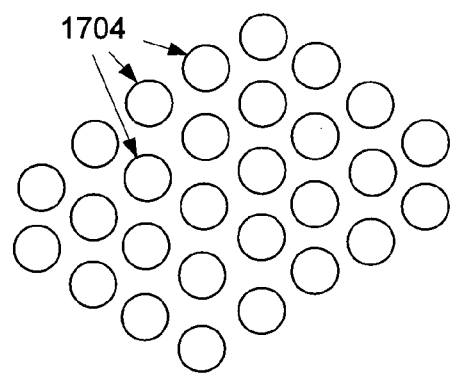
Fig. 17a
Fig. 17b
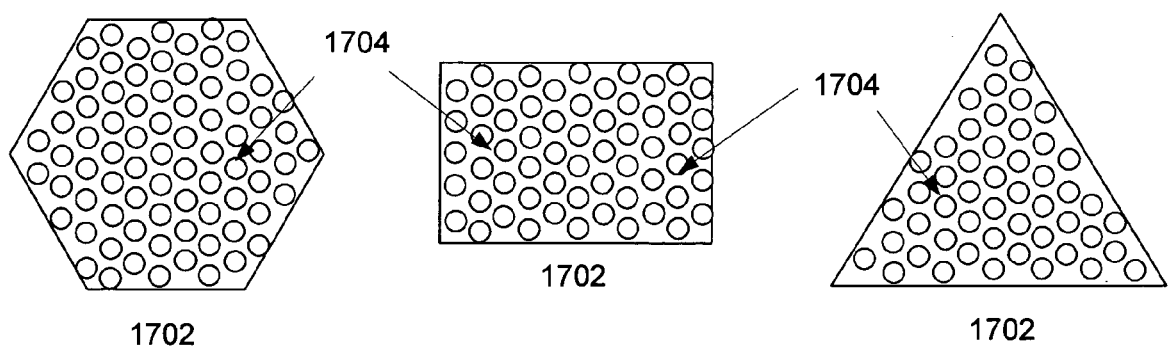
Fig. 17c

Figure 21a                                  Figure 21b

CONTROLLED CONCENTRATION ELECTROLYSIS SYSTEM

This application is a continuation-in-part of U.S. patent application Ser. No. 10/424,539 filed Apr. 24, 2003, which is hereby incorporated by reference herein as though set forth in full.

This application claims the benefit of U.S. Provisional Application No. 60/410,429 filed Sep. 12, 2002, U.S. Provisional Application No. 60/410,426 filed Sep. 12, 2002, U.S. Provisional Application No. 60/410,548 filed Sep. 12, 2002, U.S. Provisional Application No. 60/410,565 filed Sep. 12, 2002, and U.S. Provisional Application No. 60/410,590 filed Sep. 12, 2002, each of which is hereby fully incorporated by reference herein as though set forth in full.

BACKGROUND OF THE INVENTION

1. Field of the Invention

This invention relates generally to production of metal particles through electrolysis, and more specifically, to a system for controlling the concentration of the electroreducible metal species to optimize the quality of metal particles produced through electrolysis.

2. Related Art

There are many applications for metal particles produced through electrolysis including, for example, for use as feedstock for laboratory and industrial processes, and for use in refuelable and regenerative metal/air fuel cells. In these fuel cells, the metal particles function as the fuel for replenishing discharged fuel cells, and this fuel can be regenerated from the spent reaction solution which results from fuel cell discharge. In applications such as this, it is desirable to be able to regenerate the metal particles in a space efficient and self contained manner so that the regeneration of the metal particles can take place at the same location as the power source or cell stack within the fuel cell. For additional information on metal/air fuel cells, the reader is referred to the following patents and patent applications, which disclose a particular embodiment of a metal/air fuel cell in which the metal is zinc: U.S. Pat. Nos. 5,952,117; 6,153,328; and 6,162,555; and U.S. patent application Ser. Nos. 09/521,392; 09/573,438; and 09/627,742, each of which is incorporated herein by reference as though set forth in full. The term "fuel cell" as used throughout this disclosure is synonymous with the terms "battery" and "refuelable metal/air battery."

Unfortunately, known methods of producing metal through electrolysis are all unsatisfactory for these applications. Some methods, e.g., electroplating, do not produce metal in the required particulate form, and require expensive and cumbersome mechanical processing to put the metal in the required form.

For example, a method disclosed in U.S. Pat. No. 4,164,453 forms zinc dendrites on cathode tips that protrude into an anodic pipe carrying a flow of zincate solution. The cathode protrusions are specially formed in a curved configuration. Dendrites form on the cathode tips during low flow in one direction, and are then dislodged during high flow in the opposite direction. This technique is not suitable for particle production because it yields dendritic zinc that requires further processing to make pellets. Also, the curved cathodic protrusions are expensive to manufacture, and spatially inefficient.

Another method, represented by U.S. Pat. No. 5,792,328, involves electro-depositing dendritic or mossy zinc onto the surface of a planar cathode plate, and then scraping the zinc from the surface of the cathode. Since the recovered metal is in the form of mossy dendrites, and cannot be easily put into the desired particulate form absent expensive and complicated mechanical processing steps, this method is likewise not suitable.

A third method, in U.S. Pat. No. 3,860,509, uses a cathodic surface that consists of many small conductive areas in the hundred micron range spaced apart by an insulating matrix. These areas are exposed to a high temperature metal bearing electrolyte solution which, by electrolysis, deposits metal dendrites on the cathode. The metal is recovered by mechanically scraping the cathode which produces a powdery metal dust composed of particles so small that they are not suitable for use in a metal/air fuel cell.

A fourth method, known as electrowinning, represented by U.S. Pat. Nos. 5,695,629 and 5,958,210, involves immersing seed particles in an electrolyte, and causing metal to form over the seed particles through electrolysis. However, because of the risk that metal particles will get caught in a porous separator between the anode and cathode, and cause a disastrous short between the anode and cathode, this method is unsatisfactory. Another factor weighing against this method is the burden and expense of maintaining a supply of seed particles.

Another method, represented by U.S. Pat. No. 5,578,183, involves forming dendritic or mossy metal on a cathode through electrolysis, removing the metal, and then pressing the metal into pellets through mechanical forming steps such as extrusion. This technique is unsuitable for the applications mentioned earlier because the required mechanical forming steps are expensive, and do not permit a space-efficient and self-contained particle recovery process.

SUMMARY

A system for producing metal particles through electrolysis is described. Particle quality is controlled by maintaining concentration of the electroreducible metal species undergoing electrolysis within a predetermined concentration range. The system comprises a first container containing a body of an electrolyte solution in which a metal is partially dissolved, a second container in fluid communication with the first container, the second container containing a second body of the solution, and a means for exchanging solution between the containers. The second container is configured with a means for electrolyzing, and a means for sensing the concentration of, the dissolved metal in the second body. During electrolysis, if the sensed concentration is within a predetermined range, the second body is circulated through the electrolyzing means, and if the sensed concentration is outside or nearly outside the range, the solution is exchanged to maintain the concentration within the range. The system also controls particle quality by sensing a temperature of the second body, and maintaining the temperature within a predetermined range responsive to the sensed temperature by exchanging, cooling, or heating the solution comprising the second body.

A method for quality control in the production of metal particles through electrolysis using the aforedescribed system is also disclosed. The method comprises steps for containing a body of the electrolyte solution in a first container, containing a second body of the solution in a second container, and circulating the second body through an electrolyzer while maintaining for the second body, the temperature of the electrolyte, and the concentration of the dissolved metal, within predetermined ranges during electrolysis. Additional steps comprise sensing the temperature and concentration by respective sensing means, and responsive to the sensed temperature or concentration, exchanging, cooling, or heating the solution comprising the second body.

A means for electrolyzing the dissolved metal using a discrete particle electrolyzer is also described. An anode and cathode spaced from one another are at least partially immersed in a solution of dissolved metal. The surface of the cathode is configured with one or more active zones separated from one another by an insulator. The active zones are made of a material which is electrically conductive. An electric potential is applied between the anode and the cathode while the solution containing the dissolved metal is caused to flow along the surface of the cathode. The electric potential causes an electric current to flow through the solution. The current density is sufficient to allow metal particles to form on the active zones of the cathode through electrolysis. When the metal particles are of sufficient size, they are removed from the surface of the cathode through a scraper or other suitable means integral to the cathode structure, and applied to the surface of the cathode.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 2b shows a magnified side view of the cathode of FIG. 2a.

FIG. 3a shows a side view of a second embodiment of a cathode.

FIG. 3b shows a top view of the cathode of FIG. 3a.

FIG. 16b shows a side view of the plate of FIG. 16a.

FIG. 16c shows a magnified side view of the plate of FIG. 16a.

FIG. 17a illustrates a minimal number of active zones arranged in a hexagonal array.

FIG. 17b shows a plurality of active zones arranged in a hexagonal array.

FIG. 17c depicts active zones in hexagonal array on coins of different shapes that form a portion of a planar cathode surface formed according to one embodiment of the invention.

DETAILED DESCRIPTION

Figure 1:
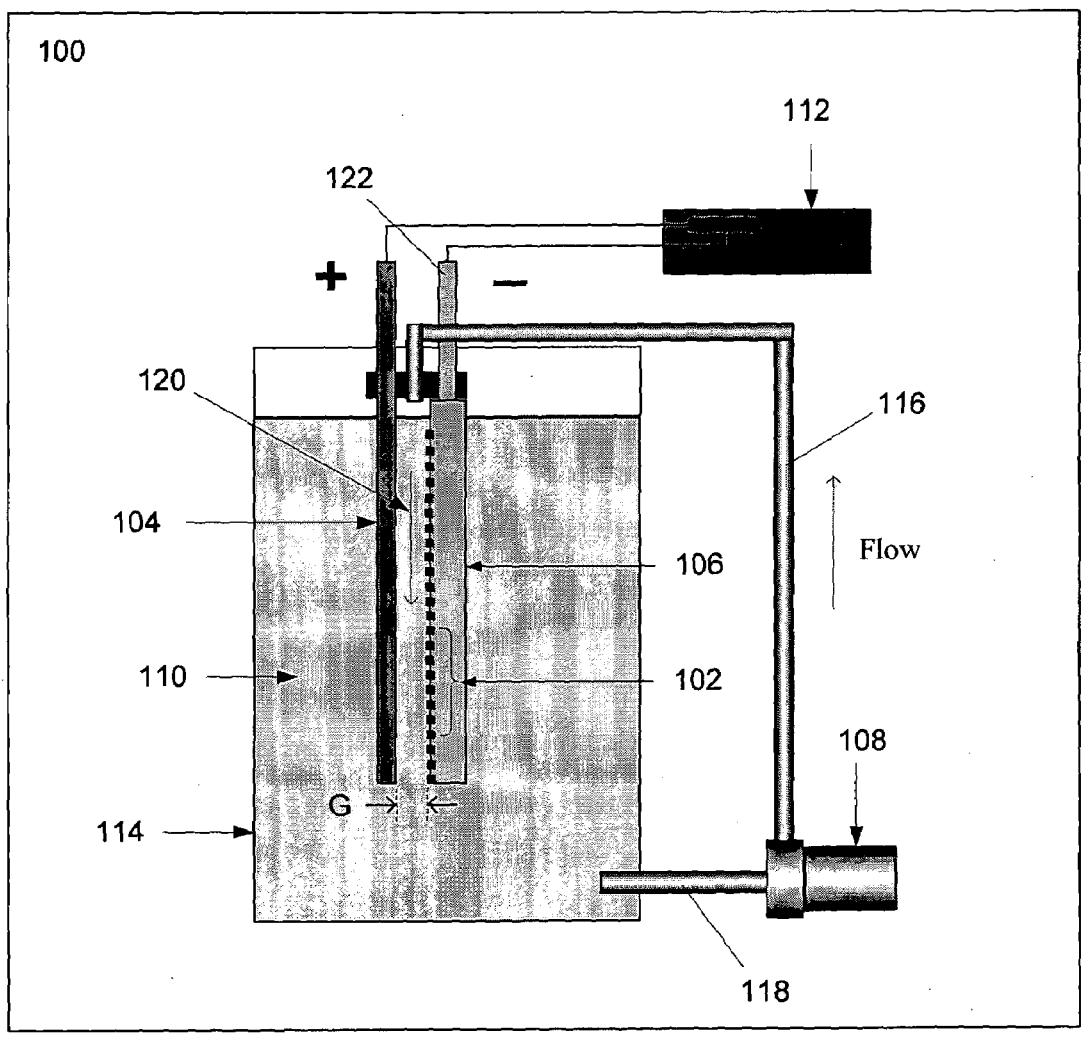
FIG. 1 illustrates a first embodiment of a system for producing metal particles through electrolysis, including a lateral view of electrolyte flow across the cathode surface.

FIG. 1 illustrates a system 100 configured to produce metal particles by electrolysis of a reaction solution 110 that contains dissolved metal. Solution 110 may be aqueous or non-aqueous, and may be an electrolyte, acid, or organic solvent. It may contain metal ions in the form of one or more oxides or salts of the metal. In one implementation, the solution 110 contains reaction products, such as zincate, of an electrochemical reaction occurring in a metal/air fuel cell. Examples of the metal include zinc, copper, nickel, and potassium. In one implementation example, the reaction solution comprises potassium hydroxide (KOH) containing zincate, $Zn(OH)_4^{2-}$, or dissolved zinc oxide, ZnO, a white non-toxic powder which is soluble in the reaction solution. The zincate in this implementation example may be produced through the following electrochemical reaction which occurs in one embodiment of a zinc/air fuel cell:

$$Zn+4OH^- \rightarrow Zn(OH)_4^{2-}+2e^- \qquad (1)$$

Zinc oxide may then be formed through precipitation of the zincate in accordance with the following reaction:

$$Zn(OH)_4^{2-} \rightarrow ZnO+H_2O+2OH^- \qquad (2)$$

The system 100 produces metal particles through electrolysis which occurs between the rightmost surface of anode 104 and the leftmost surface of cathode 106. Anode 104 and cathode 106 are electrodes at least partially immersed in solution 110, and are coupled, respectively, to the positive and negative terminals of power supply 112. The solution 110 is contained within container 114.

In the previously discussed implementation example of system 100, the following reaction may take place at the cathode:

$$Zn(OH)_4^{2-}+2e^- \rightarrow Zn+4OH^- \qquad (3)$$

The two electrons in this equation originate from the cathode where the following reaction takes place:

$$2OH^- \rightarrow \frac{1}{2}O_2 + H_2O + 2e^- \qquad (4)$$

Pump 108 provides a means for circulating solution 110 into and out of container 114. The solution flows into container 114 through conduit 116, and flows out of container 114 through conduit 118. By pumping solution into and out of container 114, a flow path 120 of solution along the surface of cathode 106 is created. Cathode 106 includes on its surface a plurality of active zones 102 that are exposed to the solution 110 flowing along flow path 120. As pump 108 causes solution 110 to flow past the active zones 102, while power supply 112 energizes anode 104 and cathode 106, metal particles are formed on the active zones 102 by electrolysis. Once formed, the particles may be removed from the active zones 102 by a scraper or other suitable means. The active zones 102 may be formed of a material with easy release surface properties to facilitate removal of the metal particles. These surface properties may be imbued by a suitable coating added to the surface of the active zones, or through oxidation of the surface of the active zones. Materials capable of forming active zones having oxide layers include magnesium, nickel, chromium, niobium, tungsten, titanium, zirconium, vanadium, and molybdenum.

The active zones 102 are formed of a conductive material and are electrically coupled to conductor 122 within the cathode 106. The active zones 102 are electrically isolated from one another at the cathode surface by an insulator. The design of the conductor, insulator, and active zones may be tailored to suit a particular application, thus, the surface of the cathode may take on a variety of forms. It may be flat or curved, and have a general shape that is planar, cylindrical, spherical, or any combination thereof. The cathode may have a single surface with active zones, or may have multiple surfaces with active zones. The size and number of the active zones on the surface of the cathode determine, generally, the size and number of metal particles that the system will produce in a single operation.

An active zone, considered separately, may itself have a flat or curved surface, may assume any regular geometric shape, or may have an irregular shape. The separation distance between the nearest points of any two active zones is between about 0.1 mm and about 10 mm, preferably between about 0.4 mm and about 0.8 mm, and the surface area of each active zone is no less than about 0.02 square mm. The active zones, considered collectively, may comprise multiple shapes, sizes and placement patterns. The active zones may be formed from the conductor, or may be separate parts connected thereto.

A perforated insulator that covers the conductor, exposing areas of the conductor to the cathode surface, may form the active zones. It is also possible to form the insulator by creating an oxide layer on the surface of the conductor that separates the active zones. A skilled artisan will appreciate from a reading of this disclosure that the conductor, insulator, and active zones may be composed from a variety of materials, and be configured in a variety of ways. Accordingly, many variations in the design of the cathode are possible.

Figure 2A:
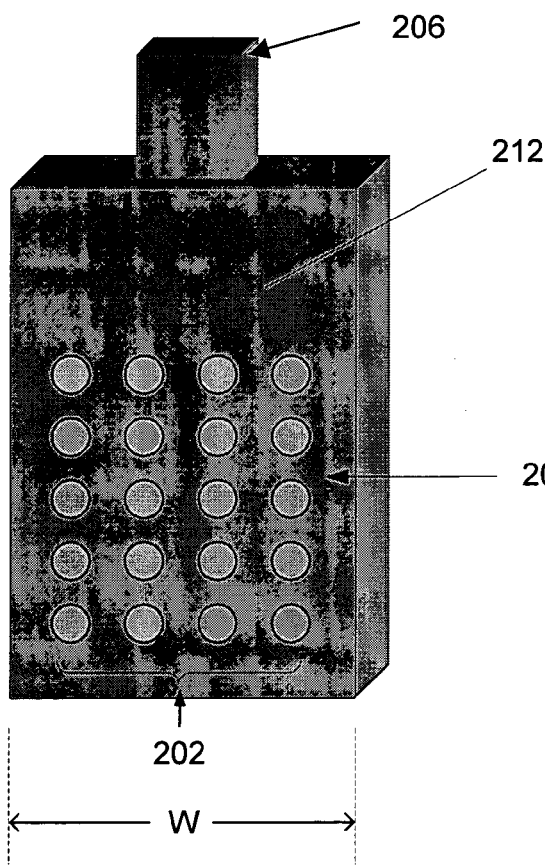
FIG. 2a shows the front view of an embodiment of a cathode.
Figure 2B:
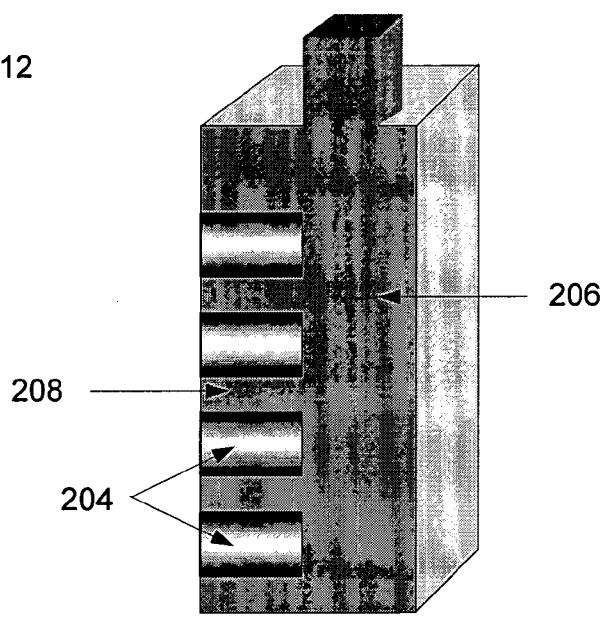

One embodiment of a cathode 200 is illustrated in FIG. 2a. In this embodiment, cathode 200 has a generally planar form, with a plurality of active zones 202 occupying one of the planar surfaces 212. A plurality of pins 204 extend from and are electrically coupled to conductor 206 within the cathode 200, as shown in magnified form in FIG. 2b. The ends of the rods 204 at the surface 212 of the cathode form the active zones 202. The rods 204 may be machined from conductor 210, or may be separately attached to conductor 210 by threaded connection, welding, or other means. Both the rods 204 and conductor 210 are electrically conductive, but need not be made from the same material. An insulator 208 fills the gaps between rods 204 to maintain separation and electrical isolation between the active zones 202 and create a generally flat surface 212. It also coats the remaining surfaces of conductor 210 sufficiently such that the active zones 202 are the only conductive portion of cathode 200 which is immersed in solution 110 in the system 100. The insulator 208 may be formed from a potting compound, a molded plastic, or any other dielectric material.

Figures 3A, 3B:
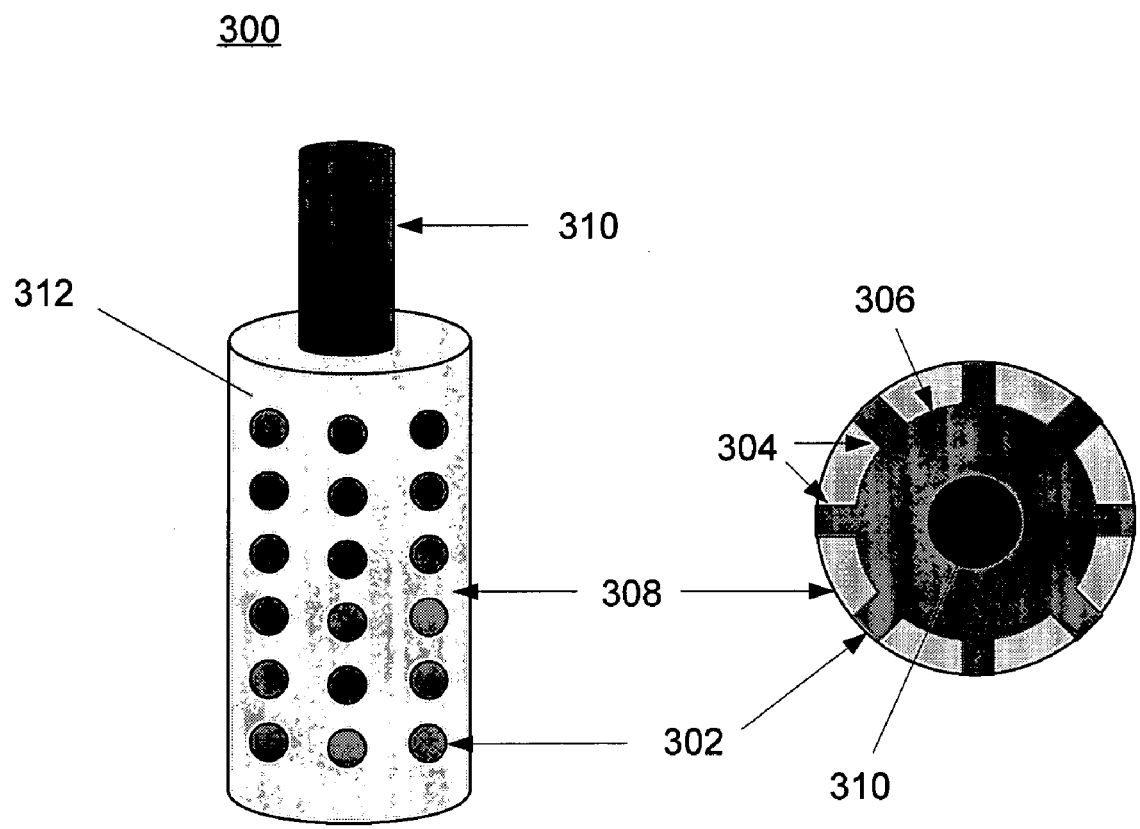

A second embodiment of a cathode 300 is illustrated in FIGS. 3a. In this embodiment, cathode 300 is generally cylindrical in form, with a plurality of active zones 302 spaced around the outer surface 312 of the cylinder. As illustrated in FIG. 3b, rods 304 extend radially outward from conductor 306, and the ends thereof at the outer surface 312 of the cylinder form the active zones 302. Conductor 306 includes a center terminal 310 that extends axially through the cylinder, and acts as a means for external electrical connection. Insulator 308 fills the interstices between active zones 302 to achieve electrical isolation of the active zones from at each other at surface 312, and also to complete the surface 312.

Figure 4:
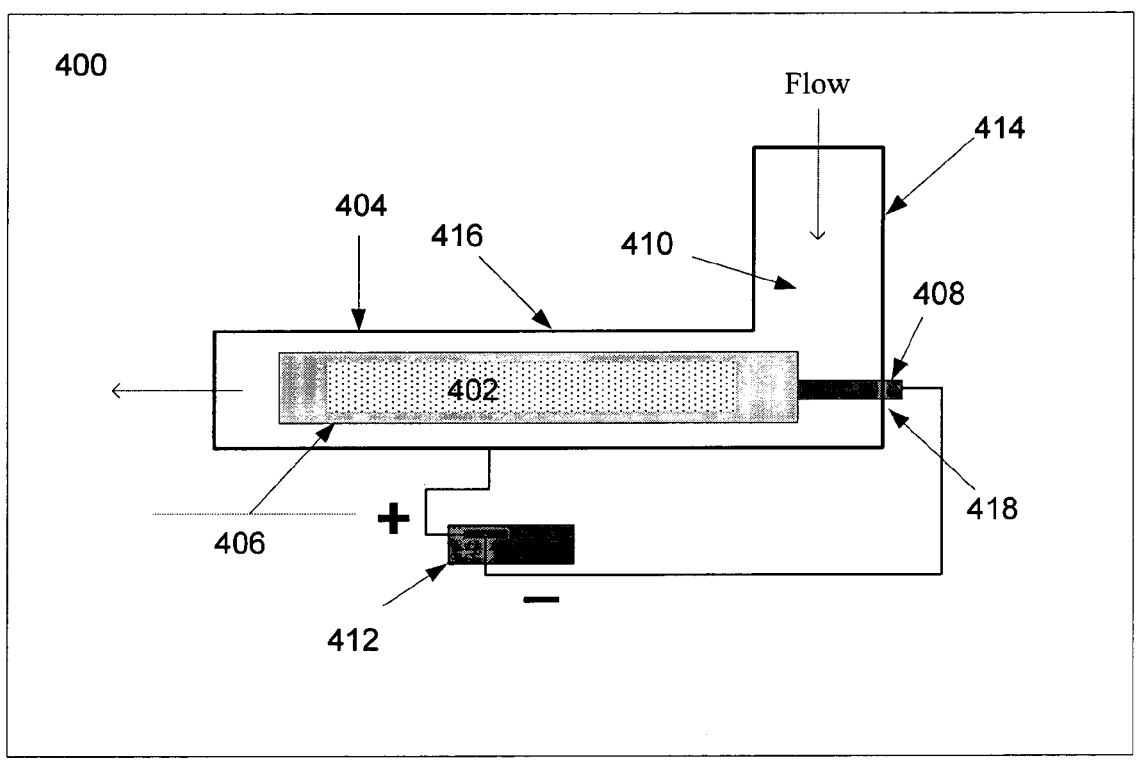
FIG. 4 illustrates an embodiment of a system for producing metal particles through electrolysis in which a cylindrical cathode is mounted within an anode pipe.

FIG. 4 illustrates a second embodiment of system for metal particle production. In system 400, the electrolysis occurs inside a metal pipe 404 that functions as the anode. Metal pipe 404 has a first portion 414 and a second portion 416, and cathode 406 is situated within the second portion 416 of the pipe 404 as shown. Solution 410 flows through pipe 404, entering the first portion 414 and exiting the second portion 416 as shown. At the same time, power supply 412 creates an electric potential between pipe 404 and cathode 406. In one embodiment, the cathode 406 is cylindrical in shape and is configured as shown in FIG. 3a. The active zones of cathode 406 are identified with numeral 402. A bus bar 408 couples electrical energy from power supply 412 to the cathode 406 through a penetration 418 in pipe 404, while maintaining a watertight seal for pipe 404 at the point of penetration 418, and maintaining electrical insulation between cathode 406 and pipe 404 at the point of penetration 418.

Figure 5:
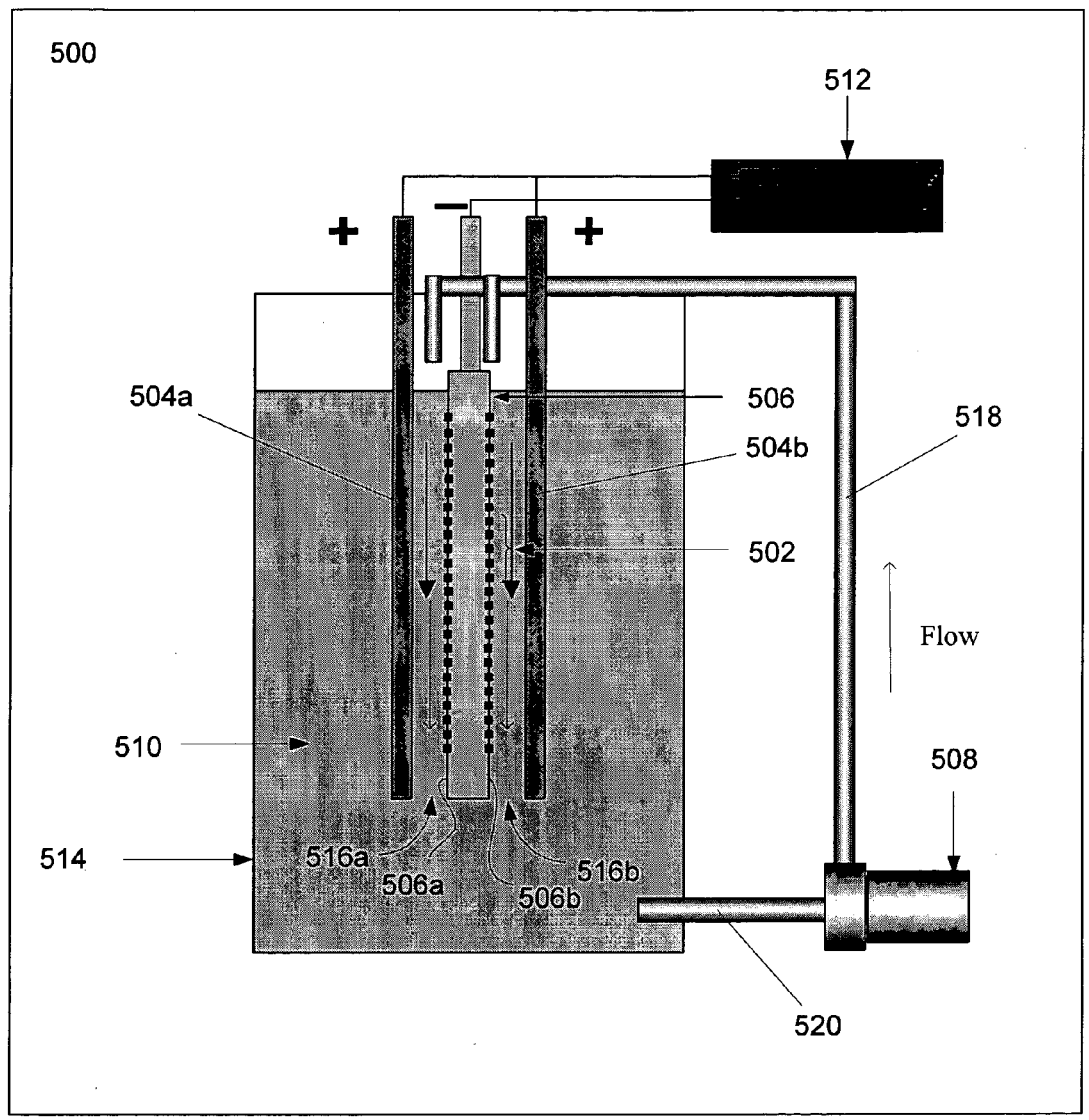
FIG. 5 illustrates an embodiment of a system for producing metal particles through electrolysis configured with a double-sided planar cathode.

A third embodiment of a system 500 for metal particle production is illustrated in FIG. 5. In system 500, a double-sided planar cathode 506 is situated between planar anodes 504a and 504b. In a manner similar to system 100 illustrated in FIG. 1, pump 508 circulates solution 510 into container 514 through conduit 518, and out of container 514 through conduit 520. The solution 510 is caused to flow past the surfaces 506a and 506b of cathode 506 by means respectively of flow paths 516a and 516b. Flow paths 516a and 516b in turn are created through the circulation of the solution 510 through the container 514. While solution 510 flows along flow paths 516a and 516b, power supply 512 energizes anodes 504 and cathode 506 to cause formation of metal particles on active zones 502 of the surfaces 506a and 506b of cathode 506. Once formed, the metal particles may be removed as in the previous embodiments. In this embodiment, anodes 504 are electrically connected in parallel.

Figure 6:
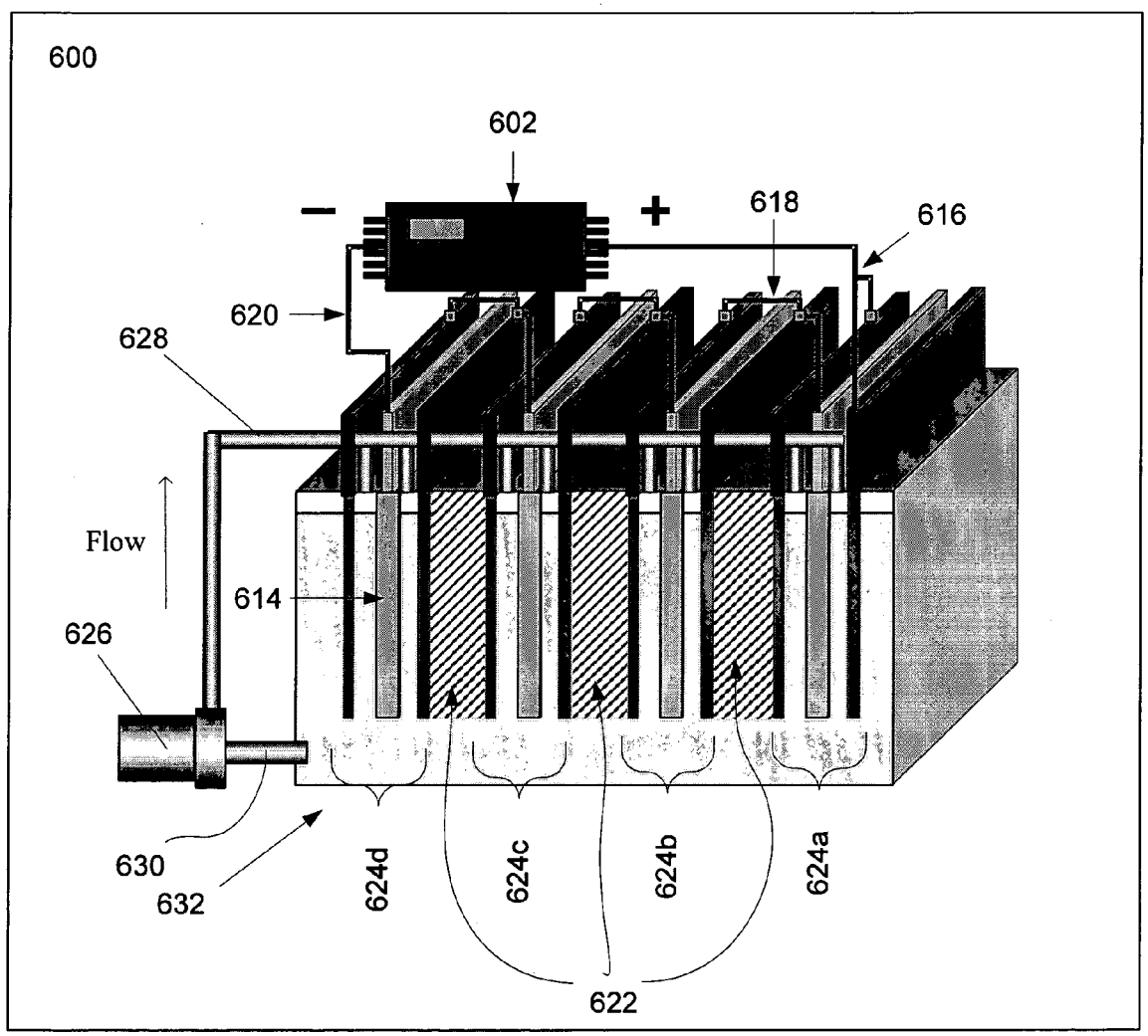
FIG. 6 illustrates an embodiment of a system for producing metal particles through electrolysis configured with multiple double-sided planar cathodes in a series configuration and dielectric material separating adjacent anodes.

A fourth embodiment of a system 600 for metal particle production is illustrated in FIG. 6. System 600 comprises a plurality of the systems of FIG. 5 coupled in series. In FIG. 6, four such systems are shown, identified with numerals 624a, 624b, 624c, and 624d, but it should be appreciated that embodiments are possible in which fewer or more than four such systems are provided.

The series connection is achieved as follows: Coupler 616 connects the positive terminal of power supply 602 to the anode pair in the first system 624a. Coupler 618 connects the cathode in the first system 624a to the anode pair in the second system 624b. Similar couplers respectively connect the cathode in the second system 624b to the anode pair in the third system 624c, and the cathode in the third system to the anode pair in the fourth system 624d. The cathode in the fourth system 624d is then coupled to the negative terminal of power supply 602 through coupler 620. A dielectric material 622 may be placed between the anode plates in adjacent systems that may be at different electric potentials to prevent electrolysis between anodes.

A pump 626 pumps solution to each of the system 624a, 624b, 624c, and 624d through conduit 628 in the manner shown. The solution flows through each of the systems 624a, 624b, 624c, and 624d, through flow paths which cause solution to flow across the two surfaces of the cathode in each system. After flowing through the individual system, the solution then collects in the bottom 632 of the overall system 600, and is then returned to pump 626 by means of conduit 630. Each of the systems 624a, 624b, 624c, and 624d are configured as previously described in relation to the system of FIG. 5.

Figure 7:
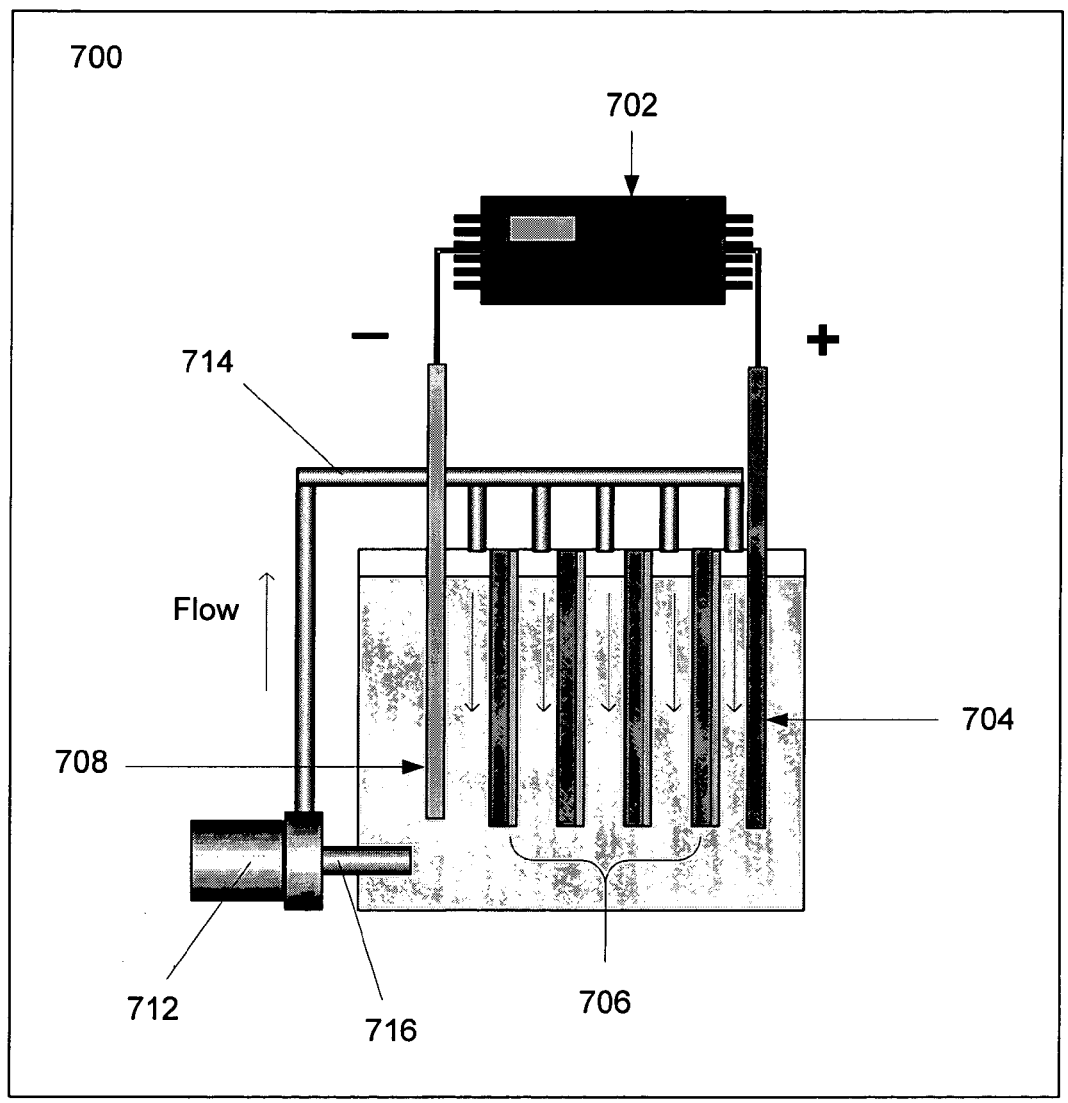
FIG. 7 illustrates an embodiment of a system for producing metal particles through electrolysis configured with multiple dual cathodic/anodic plates in a series configuration.

FIG. 7 illustrates a fifth embodiment of a system 700 for producing metal particles. In system 700, each of electrodes 706 is a bipolar cathodic-anodic plate, having an anode plate on one surface, and having on the other surface a plurality of active zones electrically coupled to the anode plate and separated from each other by an insulator. The series connection is made by coupling the positive terminal of power supply 702 to electrode 704, which is a plain anode plate, and by coupling the negative terminal of 702 to electrode 708, which is a plain cathode plate. This creates a path for the flow of electric current from anode 704 through the sequence of bipolar electrodes 706 to cathode 708. Thus, a series configuration of bipolar electrodes 706 is formed in which the dielectric material and coupling devices included in the system of FIG. 6 are eliminated.

Pump 712 pumps solution through conduit 714 into the system 700 such that individual flow paths are created to cause the solution to flow past the cathode 708, and the cathodes in each of the electrodes 706. The solution is then returned to pump 712 by means of conduit 716.

Figure 8:
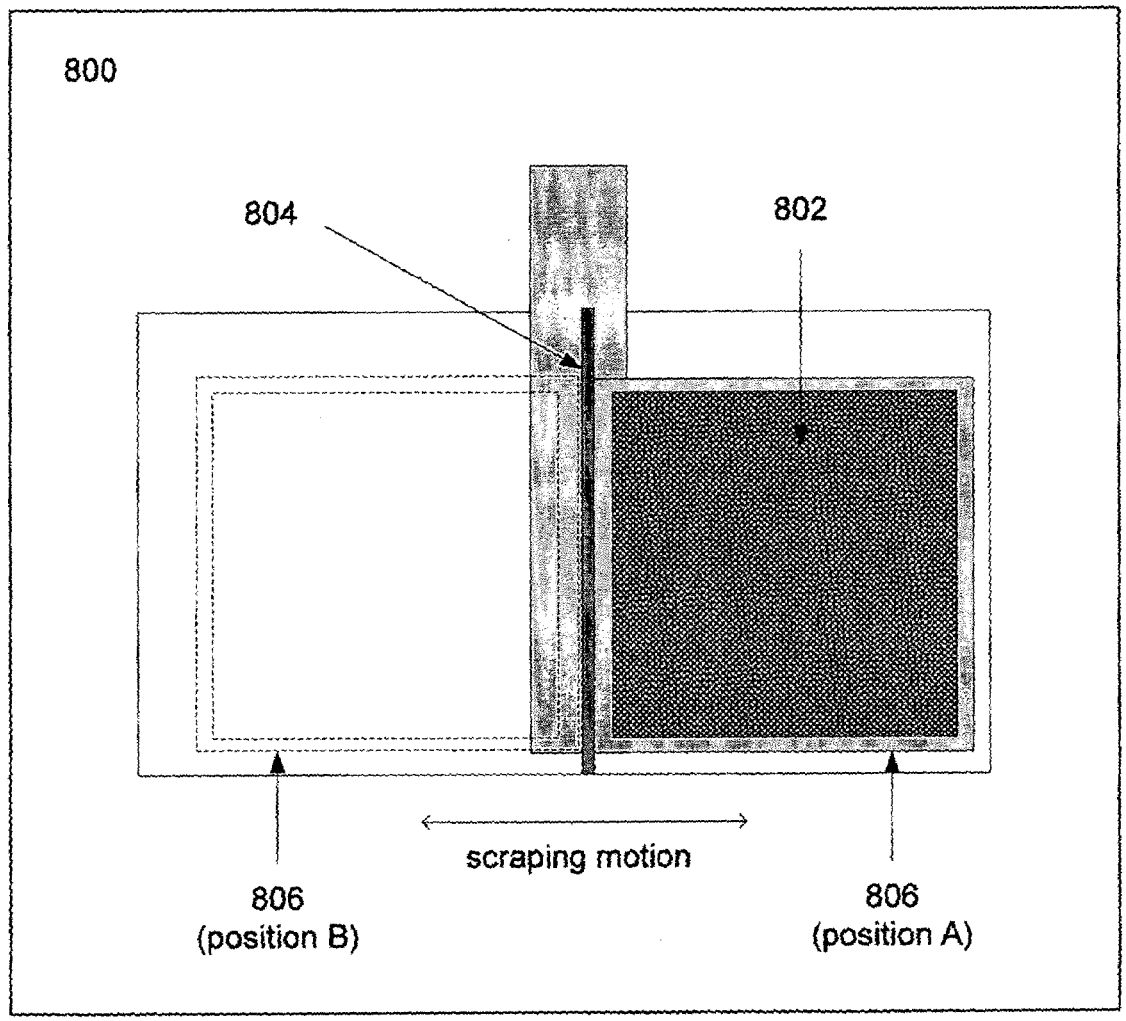
FIG. 8 shows an embodiment of a system for producing metal particles through electrolysis in which particle removal is achieved through movement of a moveable planar cathode past a stationary scraper.

Various means are possible form removing particles from the active zones of the cathode when they have reached the desired size. For example, particles may be removed by scraping the cathode surface, by vibrating the cathode, by delivering a mechanical shock to the cathode, or by increasing the flow velocity of the solution. One embodiment of a scraping means is illustrated in FIG. 8. In this embodiment, cathode 806 has outward facing active zones 802 and is movable relative to stationary scraper 804. After particles have accumulated on the active zones 802, cathode 806 is moved from position A to position B (or vice versa) such that the outer surface thereof passes against scraper 804, thus dislodging the particles. Scraper 804 may be composed of any material of a hardness sufficient to dislodge the metal particles from the active zones. In addition, as previously discussed, the material making up the active zones may have easy release surface properties to facilitate removal of the particles.

Figure 9:
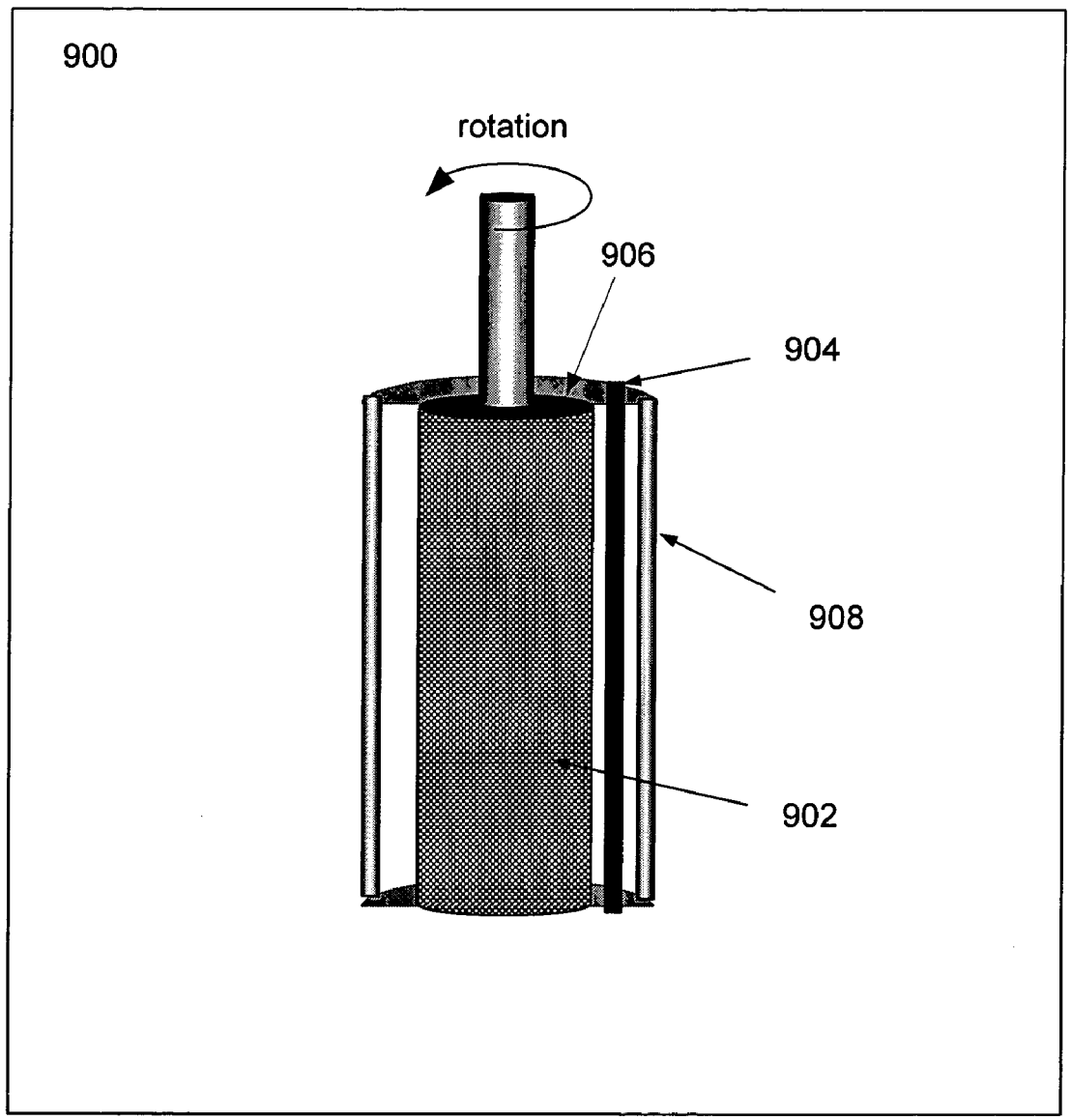
FIG. 9 is a partial view of an embodiment of a system for producing metal particles through electrolysis in which particle removal is achieved through rotation of a cylindrical cathode past a stationary scraper.

A second embodiment of a particle-removal system 900 is illustrated in FIG. 9, which shows a cut-away view of a cylindrical anode 908 enclosing cylindrical cathode 906. A scraper 904 is situated against the active zones 902 on the surface of cathode 906. Cathode 906 is configured so that it can be moved relative to scraper 904. Cathode 906 is then rotated, causing particles to be scraped from active zones 902. Scraper 902 may be mounted directly to anode 908, or may be independently mounted.

Figure 10:
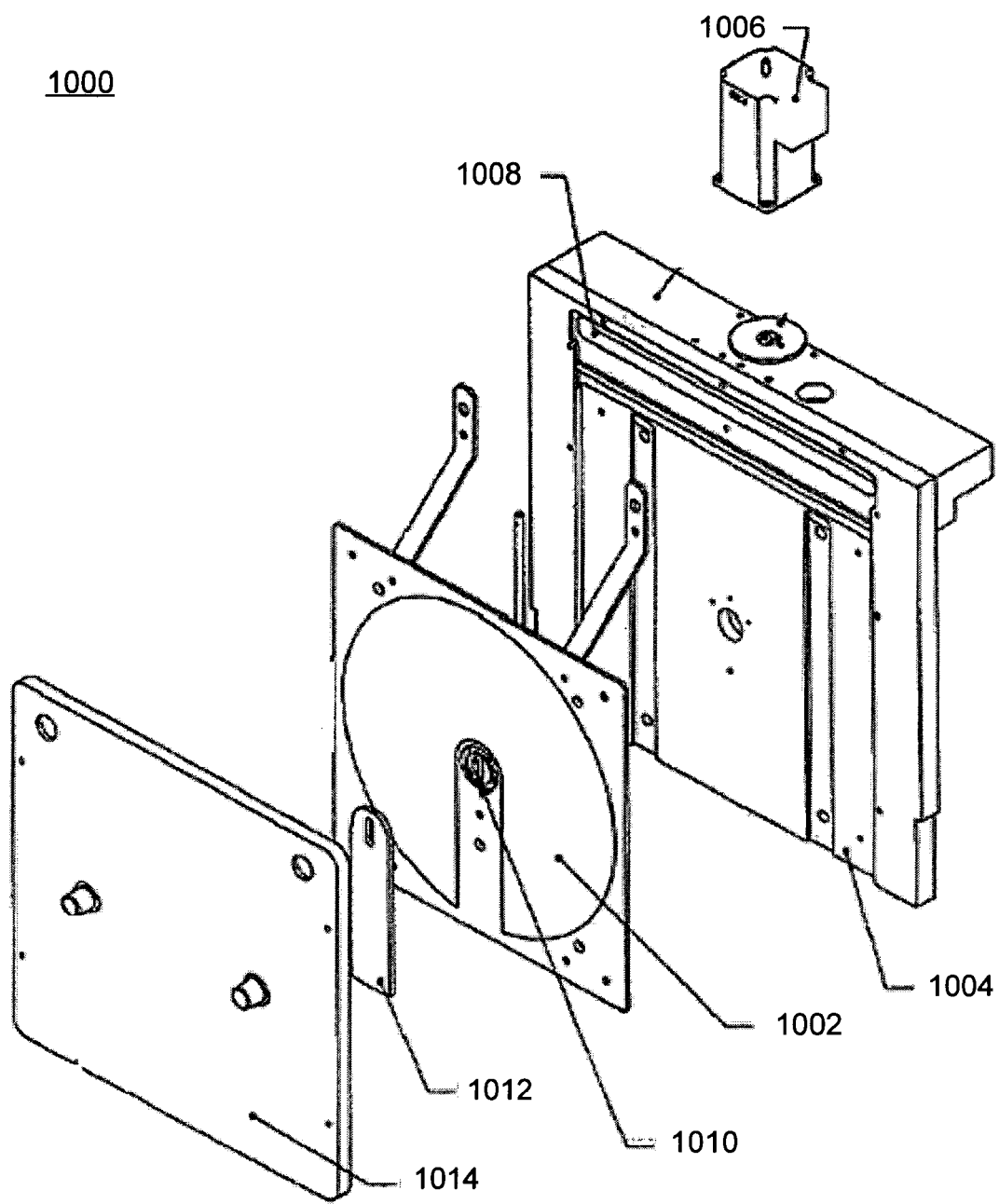
FIG. 10 is an exploded view of a system for producing metal particles through electrolysis in which particle removal from a planar cathode is achieved by means of a rotary scraper.

FIG. 10 shows an exploded view of a system according to one embodiment of the invention comprising a planar anode plate 1002 and cathode plate 1014 configured with a rotary scraper 1012. Anode plate 1002 is mounted to a back plate 1004 that provides a mounting location for drive motor 1006. Back plate 1004 also provides a fluid manifold 1008 for the passage of electrolyte solution. Drive motor 1006 is mechanically coupled to a scraper driver 1010 that is centrally located in anode plate 1002, as shown. A scraper 1012 is coupled to scraper driver 1010 such that the scraper contacts, or nearly contacts, the surface of cathode plate 1014. Cathode plate 1014, configured with a plurality of active zones, mounts to anode plate 1002 and back plate 1004 to complete the assembly and form a narrow channel (not shown) to conduct solution from fluid manifold 1008 down through the channel between anode plate 1002 and cathode plate 1014.

System 1000 operates generally as previously discussed to form metal particles on the surface of the active zones of cathode plate 1014. When the particles have grown to a desired size, drive motor 1006 is energized to rotate scraper 1012 against the particles with a minimal force required to dislodge the particles. In one embodiment, scraper 1012 may be rotated through one or more complete revolutions, as required to dislodge particles. In another embodiment, scraper 1012 may be rotated through one half of a complete revolution, thereby dislodging about half of the particles, then reversed and rotated in the opposite direction through a complete revolution to dislodge the remaining particles.

In another embodiment, scraper 1012 may be oscillated like an inverted pendulum with an increasing amplitude. Initially, scraper 1012 is positioned vertically in a twelve o'clock position. Scraper 1012 then rotates through an initial angle comprising a partial revolution, then rotates in the opposite direction through an angle greater than the initial angle to dislodge more particles, then reverses direction again. As particles are dislodged, they fall from the cathode plate 1014 by means of gravity or entrainment in fluid flow. With each reversal, scraper 1012 is rotated through an angle greater than the previous one in order to cover unscraped areas of the cathode. This process is continued until the entire cathode surface is sufficiently scraped. In another embodiment, the initial position of scraper 1012 is at a position other than twelve o'clock, for example, six o'clock. At the six o'clock position, scraper 1012 oscillates as described above, causing any dislodged particles that accumulate on scraper 1012 to fall from the cathode plate 1014 with each reversal of direction. The advantage to the pendulum movement is that it prevents excessive accumulation of dislodged particles on the scraper, thereby allowing the drive motor to deliver a minimal force and reduce the risk of particle disintegration.

Figure 11:
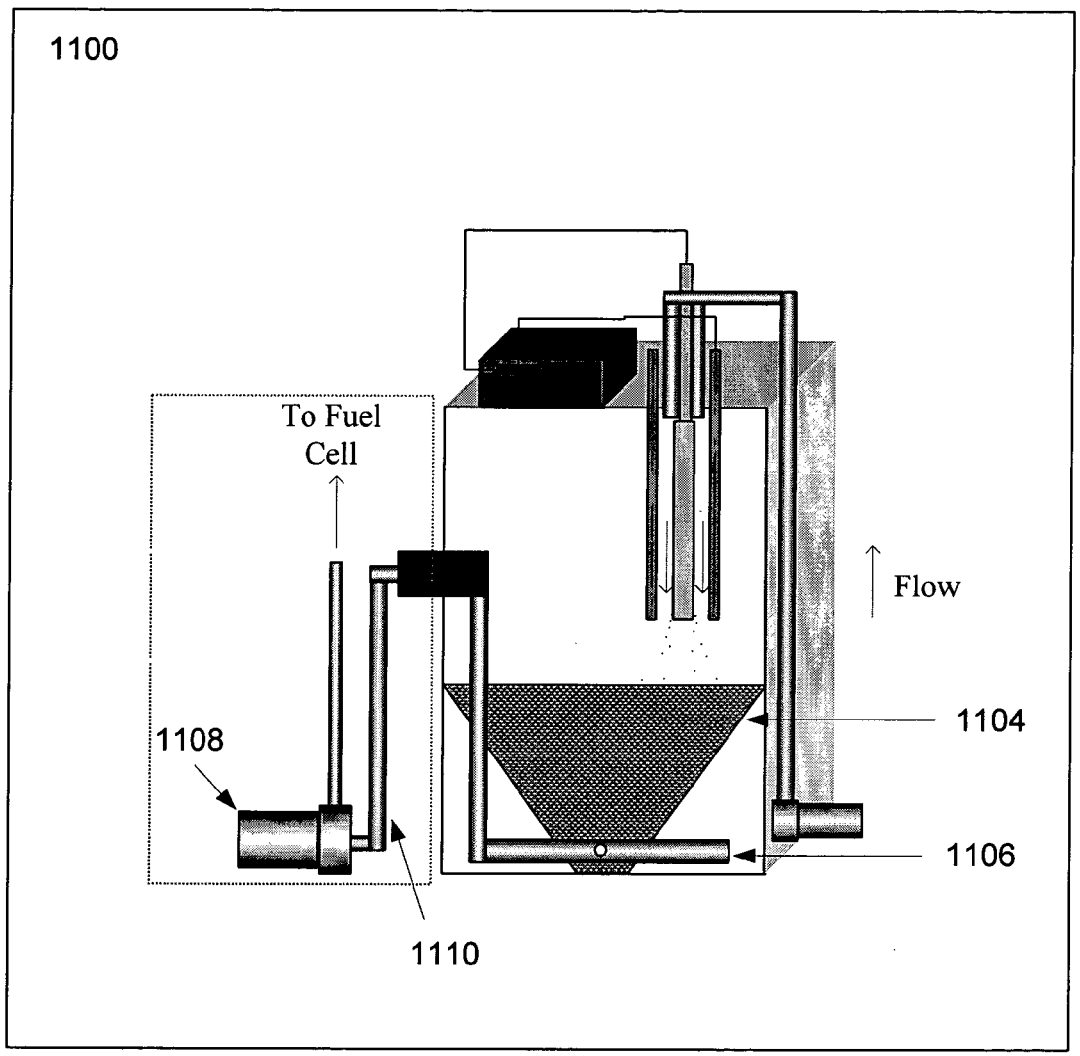
FIG. 11 illustrates an embodiment of a system for producing metal particles through electrolysis configured with means for collecting particles and automatically refueling a fuel cell with the collected particles.

FIG. 11 illustrates the system of FIG. 5 equipped with a particle-collection means. When particles have reached the appropriate size, a scraper or other means (not shown) dislodges the particles. The dislodged particles then fall by gravity, through the flow of solution, or by some other suitable means into hopper 1104, where they are funneled into collection tube 1106 and entrained in fluid flow. Pump 1108 then draws the fluid borne particles through conduit 1110 for transport to a storage device or to a fuel cell for a metal/air battery.

In order to ensure consistent shape and quality of the metal particles, it may be necessary to maintain several operational parameters within certain ranges. The flow rate and temperature of the solution, the molarity of the dissolved metal, the electrolyte concentration, the Reynolds number of the flow path past the cathode surface, flow turbulence, the electric current through the solution, and the current density at the active zones are all parameters that may need to be controlled in order to produce good quality, crystalline particles that are free of dendritic formations. The Reynolds number Re is defined as follows:

$$Re = \frac{\rho U D_h}{\mu} \quad (5)$$

where $\rho$ is the solution density, U is the solution velocity, $\mu$ is the solution viscosity, and $D_h$ is a length dimension defined as $$D_h = 4\left(\frac{WG}{2(W+G)}\right) \quad (6)$$

For a substantially rectangular flow channel, such as that depicted in FIG. 1 for flow path 120, G is the gap between the anode and cathode plates. W is the width of the channel across the anode or cathode surface, measured as shown in FIG. 2. In other words, W and G are the cross-sectional rectangular dimensions of the flow channel normal to the direction of flow. Thus, for a given $\rho$, $\mu$, and $D_h$, the Reynolds number may be controlled by controlling the velocity of the solution flow. Generally, in particle-free fluid flow, Re greater than about 2000 promotes turbulent flow.

Figure 12:
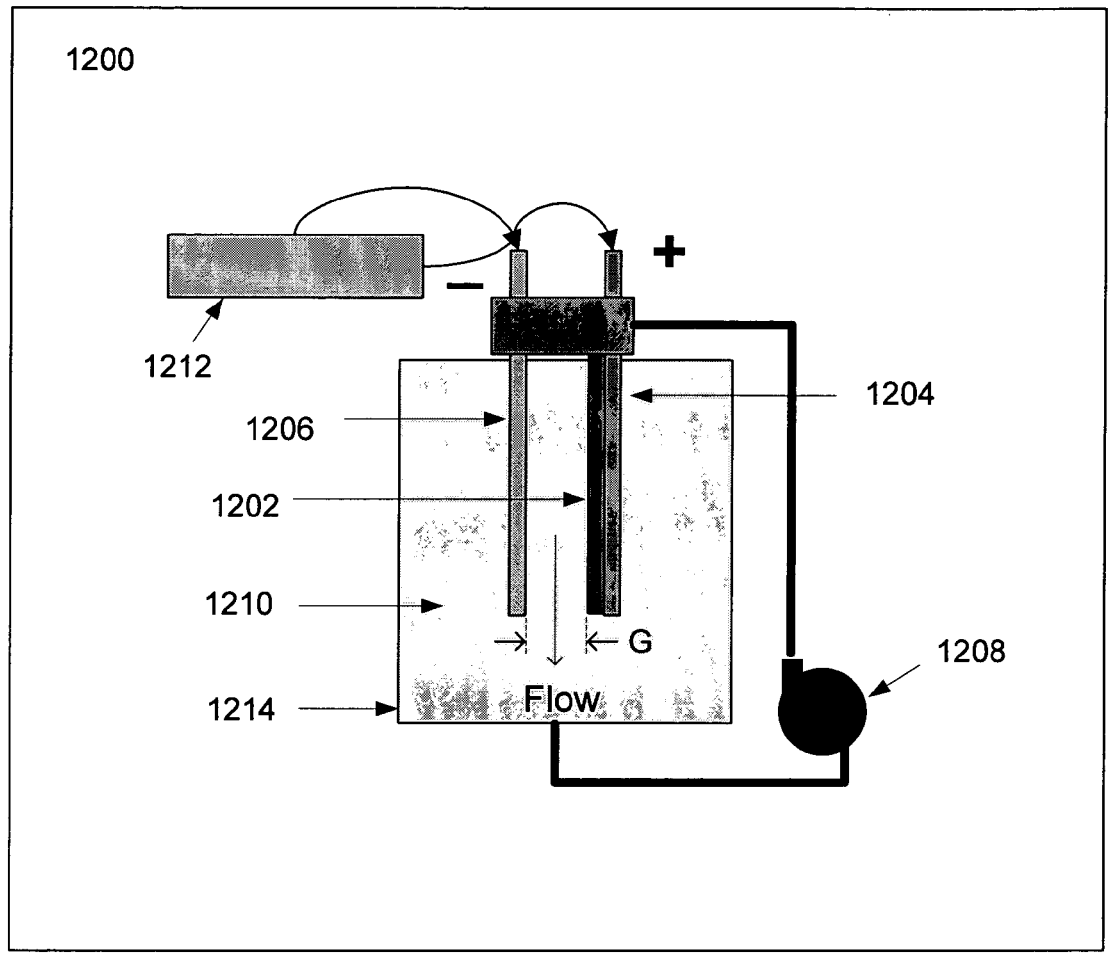
FIG. 12 illustrates an apparatus for conducting simulations of systems for producing zinc particles.

An apparatus for determining appropriate ranges for these parameters for a zinc particle production system configured to produce zinc particles through electrolysis of a potassium hydroxide solution containing zincate is illustrated in FIG. 12. The configuration and operation of the apparatus is generally similar to that of FIG. 1. Cathode 1206 in this apparatus comprises a 100 mm square Mg plate (W=100 mm) with 4900 circular active zones, each about 0.4 mm in diameter, evenly spaced in a square array. The cathode is formed from magnesium because this metal avoids a strong bond with electro-deposited zinc. The insulation separating the active zones on the cathode is formed from commercial epoxy adhesive. Cathode 1206 is partially submerged in the potassium hydroxide solution containing zincate and spaced 3 mm (G=3 mm) from anodic surface 1202. The anodic surface 1202 consists of a nickel mesh coated with oxygen evolution catalysts attached to the surface of a stainless steel plate 1204. Both cathode 1206 and anode 1202 are electrically connected to a constant current DC power supply 1212. The current from power supply 1212 can be varied from 0 to 300 A. Electrolyte 1210, consisting of aqueous solution of 45% KOH with different concentrations of ZnO, was pumped into and out of container 1214 (and through a flow path between the spacing between cathode 1206 and anode 1202) by a 100 W centrifugal pump 1208. Preferably, electrolyte concentration should be kept within the 25 to 55 weight percent range. Electrolyte temperature was maintained between a preferred range of 40 and 55 degrees Centigrade, although satisfactory results may be achieved over a much wider temperature range of between 0 and about 100 C. Reynolds numbers were calculated according to equations (5) and (6) under different flow conditions. Using the apparatus described above, various flow rates, molarities and current densities were tested for their impact on particle consistency and quality.

Figure 13:
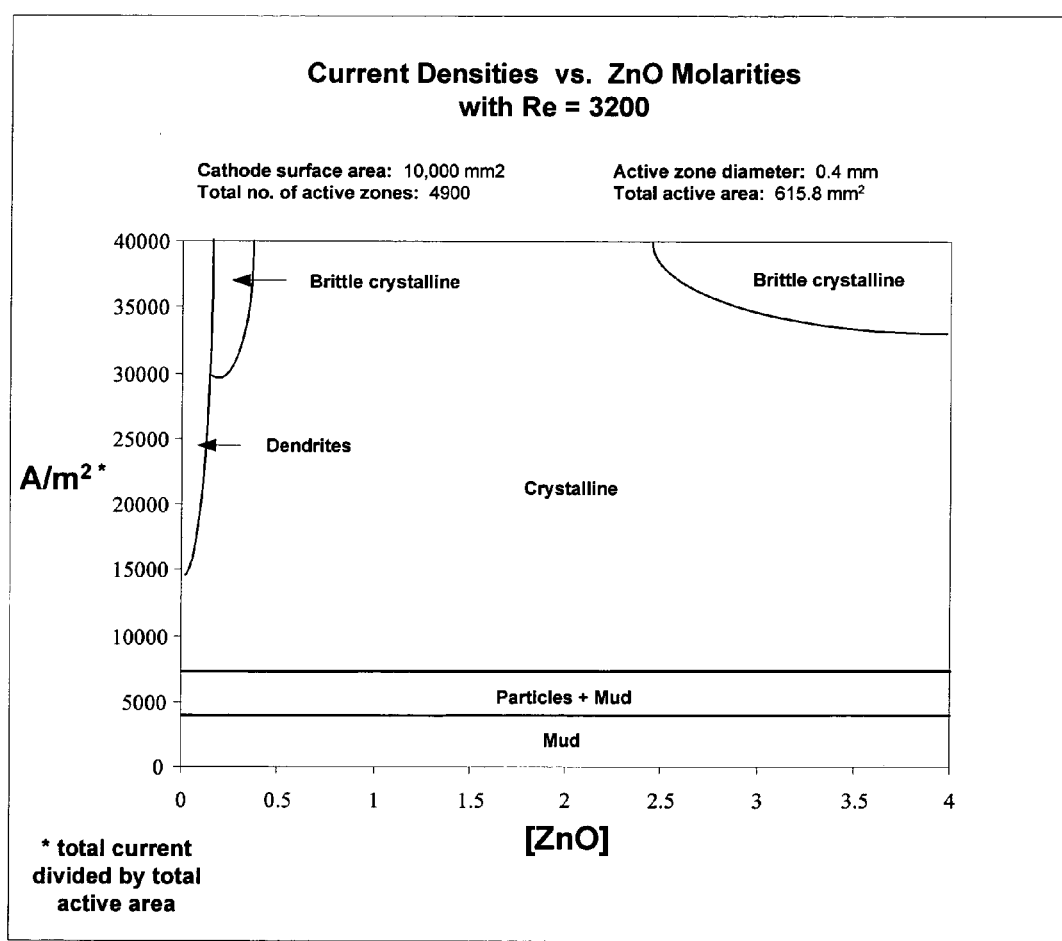
FIG. 13 plots regions of zinc particle quality as a function of current density and ZnO molarity, based on simulations conducted using the experimental testing apparatus of FIG. 12.

The results of these tests are summarized in the graph of FIG. 13. The graph plots regions of zinc particle quality as a function of current density and ZnO molarity, with the Reynolds number of the flow kept constant at approximately 3200, well within the turbulent flow range. Current density is calculated as the total load current divided by the sum of the active zone surface areas. Good quality crystalline particles were produced while operating the apparatus with ZnO concentrations in the preferred range of about 0.1 M<[ZnO]< about 4.5 M, and current densities in the preferred range of about 5,000 $A/m^2$<I< about 40,000 $A/m^2$. Current densities below about 10,000 $A/m^2$ produced poor quality zinc. At very high current densities, I> about 55,000 $A/m^2$, the apparatus produced crystalline zinc too brittle to maintain particle integrity. Current densities I> about 30,000 $A/m^2$ with low zincate concentrations, i.e., [ZnO]<0.4 M, also produced poor quality brittle, crystalline particles. Dendritic formations occurred only at very low concentrations, [ZnO]< about 0.2 M, and very high current densities I> about 15,000 $A/m^2$. Also, under laminar flow conditions, where the Reynolds number, Re, was low, i.e., Re< about 1500, the system yielded zinc formations that were dendritic and amorphous, regardless of molarity and current density. These tests indicate that within the preferred ranges of temperature, molarity, and current density, maintaining a velocity of the solution sufficient to promote turbulent flow. For purposes of this disclosure, terms such as "about" or "approximately" or "substantially" or "near" are in intended to allow some leeway in numeral exactness which is acceptable in the trade. Generally speaking, these terms refer to variations of ±25% or less. Also, for purposes of this disclosure, "turbulent" means sufficient agitation or fluctuation to achieve the condition where there is substantially no boundary layer between the solution and the growing metal particles at the one or more active zones of the cathode. Under this condition, transfer of dissolved metal atoms to the surface of the growing particle is not mass transfer controlled and the growth process is under kinetic control which provides a particle morphology suitable for fuel cell applications. In one embodiment, a turbulent flow is one where Re exceeds a transition value in the range of between about 1,000 and about 10,000. In a second embodiment, a turbulent flow is one where Re> about 1500.

Metal particle quality may also be enhanced by certain chemical additives in the electrolyte. For example, adding bismuth in the proportion 400 ppm $Bi2O_3$ to 40 liters of electrolyte, or adding indium in the proportion of 250 ppm $In(OH)_3$ to 40 liters of electrolyte, was found to generally improves particle form and consistency.

Additionally, the force required to remove the particles from the active zones was tested. For zinc particle formation on Mg zones, it was determined that minimal force was required to dislodge the particles.

Figure 14A:
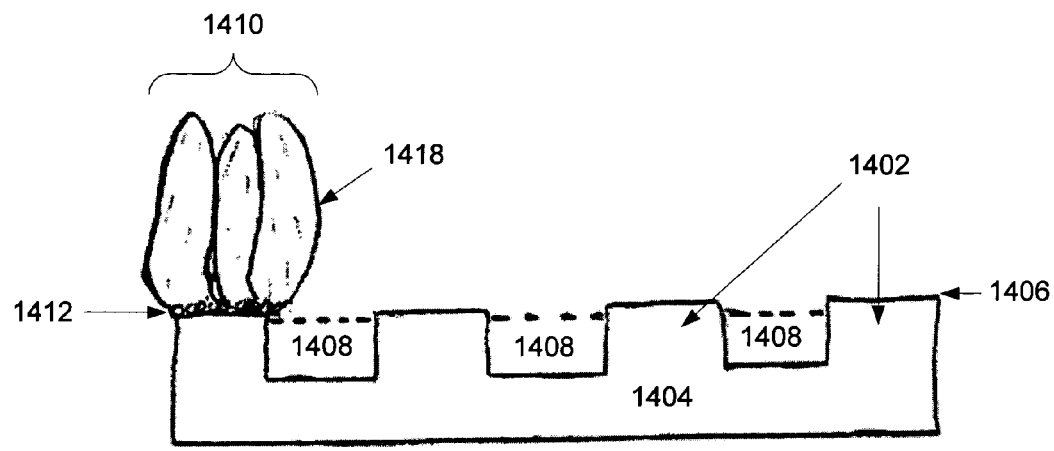
FIG. 14a shows a magnified cross sectional view of metal particle formation on a cathode surface according to one embodiment of the invention.

Metal particle shape and quality also depends on the construction of the cathode. For example, the morphology of the metal particles may be affected by the surface area of the active zones, and also by the spacing between active zones. To illustrate the formation of particles on active zones, FIG. 14a shows a magnified cross sectional view of one embodiment of a cathode surface. Pins 1402 are shown protruding from conductive substrate 1404, and insulated from each other at surface 1406 by insulating material 1408. A system operating as discussed above causes metal particles 1410 to form on active zones generally outwardly and upwardly, as shown.

Figure 14B:
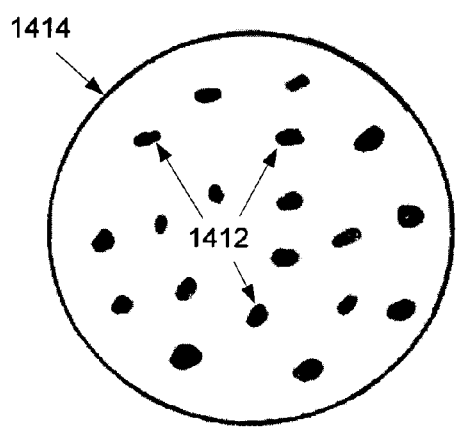
FIG. 14b shows a magnified view of the first phase of metal particle formation on an active zone of a cathode according to one embodiment of the invention.
Figure 14C:
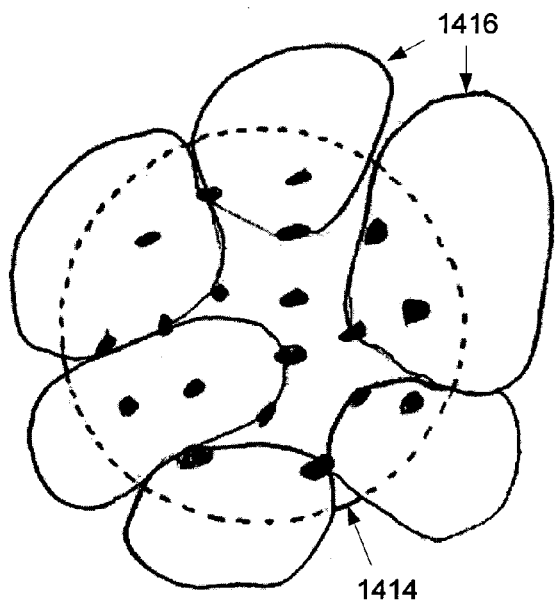
FIG. 14c shows a magnified view of the second phase of metal particle formation on an active zone of a cathode according to one embodiment of the invention.

A closer view of particle formation on the surface of an active zone is shown in FIGS. 14b and 14c. In the absence of the parametric constraints discussed above, and with active zones having large surface areas widely spaced from one another, zinc particle composition has been experimentally determined to result from three phases of growth. These experiments were conducted using cathodes having magnesium active zones approximately 0.5 mm in diameter. In the initial phase, metal deposits form as individual grains 1412 on the active zone 1414. The grains adhere weakly to the active zone, and tend to develop weak bonds between other grains. In the second phase, the metal deposits grow outwardly in the form of six to eight crystalline lobes 1416, forming a total diameter of about 0.6 to 0.8 mm. These lobes are anchored weakly to one or more grains previously deposited, and do not bond to other outwardly growing lobes. In the third phase, the lobes grow upwardly in the form of columns 1418 as shown in FIG. 14a. The columns are generally not joined to each other, but bond weakly to the grain foundation, forming the general structure of particle 1410.

Metal particles that grow from grain foundations in this fashion are not suitable for use in anode beds of metal/air fuel cells. When these particles are generally subjected to mechanical scraping or anodic dissolution, the weak adhesive forces between the grains which make up the foundation of the particle are quickly broken, and the particle disintegrates into many small grains of about 200 microns in size, and into lobes of about 100 to 200 microns in diameter and 500 microns in length. In a fuel cell, these fine particles tend to accumulate in the flow channels or at the bottom of the anode bed. This leads to a reduction in electrolyte flow and premature cell failure.

In order to eliminate grain foundations from metal particles and promote the production of stronger particles, the surface area of the active zones and the spacing between active zones should be maintained within certain limits. To determine these limits, cathodes having different active zone geometries were configured to produce different batches of zinc particles. The particles were then sieved to remove particles smaller than 0.38 mm. The remaining particles were then subjected to a collision test by placing a 150 ml sample of the particles within a 45 wt % KOH solution and circulating the mixture through a hydraulic circuit consisting of a pump, a test cylinder, a ball valve, and conduit. After 4 hours of operation, the particles were collected and again sieved. The volume of particles smaller than 0.38 mm passing through the sieve were recorded as a percentage of the initial volume. The results showed that cathodes having active zones less than about 0.04 square mm spaced apart by less than about 2.0 mm (most preferably less than about 1.0 mm) produced zinc particles that were most resistant to disintegration. If circular, in one embodiment the diameter of the active zones should be less than about 0.2 mm. In one example, the diameter is about 0.15 mm. These are high quality particles that tend to grow initially from lobes rather than from grains. In addition, the lobes of these particles tend to bond together, creating a metal particle that is coherent and mechanically strong, but also of low superficial density and high surface area. As a result, these particles have a high electrochemical reactivity, and are therefore most suitable for use in metal/air fuel cells and other industrial and chemical processes.

Figure 15A:
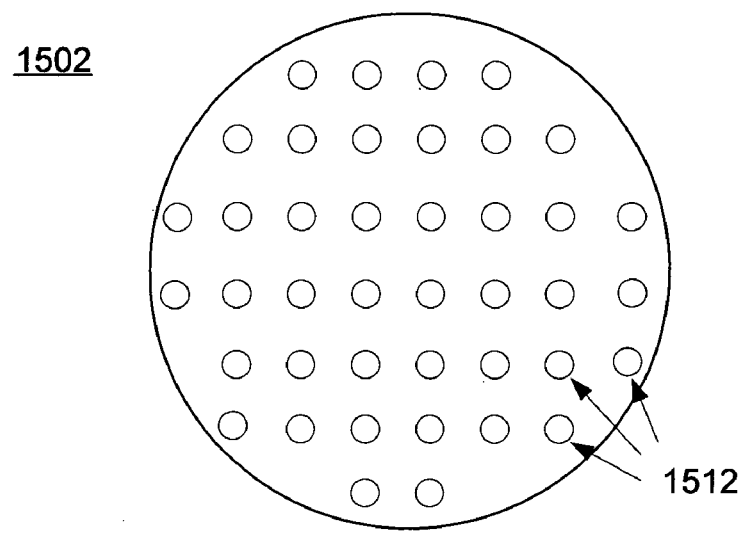
FIG. 15a shows a sliced planar cross section of a cathode surface formed from an insulated bundle of wire according to one embodiment of the invention.
Figure 15B:
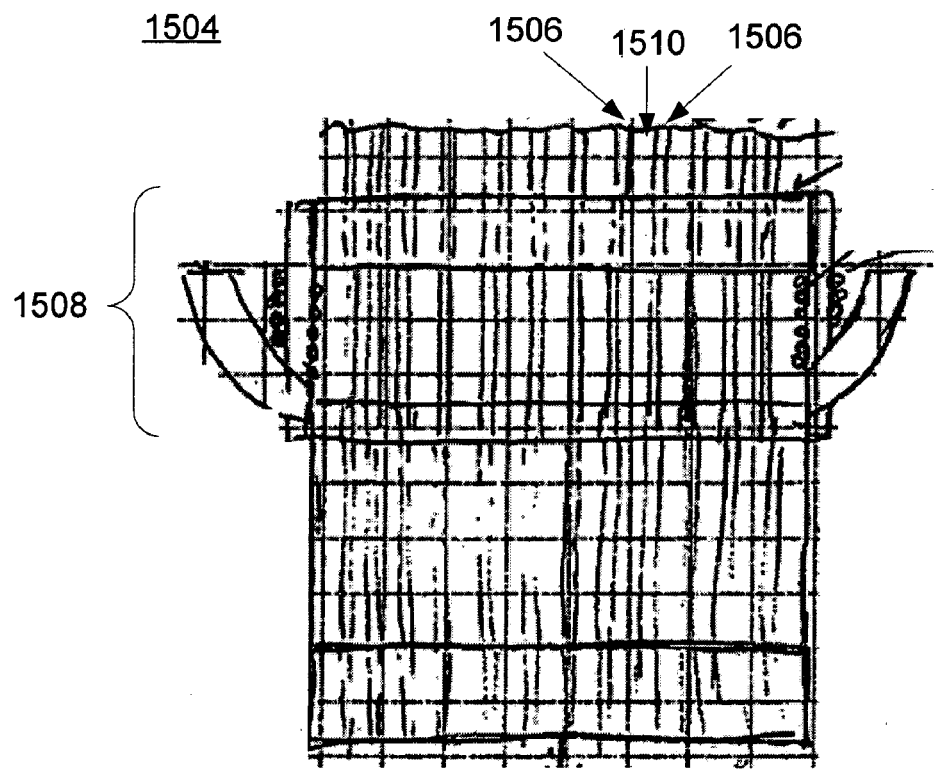
FIG. 15b shows a side view of a fixture for spacing an insulated bundle of wire for manufacturing cathodes.

A skilled artisan will recognize from a reading of this disclosure that there are many ways to construct a cathode according to the invention that is within the preferred limits for active zone geometry. In one embodiment, illustrated in FIGS. 15a (top view) and 15b (side view), the cathode surface comprises a sliced planar cross section 1502 of an insulated bundle of wire conductors 1504. Wires 1506 having the proper diameter may be held at the appropriate spacing by a special fixture 1508, and then surrounded by an insulating material 1510, for example, a thermoset epoxy compound. The bundle is then cured and sliced perpendicular to the axes of the wires to form wafers 1502 having the desired active zone geometry in cross section. A wafer may then be mechanically attached to a metal support plate by soldering, conductive adhesive, or other means, thereby electrically coupling the plate to the active zones 1512. Optionally, the assembly may then be coated with another layer of insulation so that the only exposed metal components are a bus connector and the active zones. The cathode surface having the active zones may be machined to create a smooth planar surface.

In another embodiment, the bundle may be produced by combining successively larger bundles of partially cured insulated wire. Multiple partially cured insulated wires, along with uncured insulator, are grouped together and pulled through a heat and pressure die to form a larger bundle with the proper cross sectional geometry. Multiple bundles can be combined in similar fashion with additional uncured insulator to form a single, larger bundle. The final bundle is cured and sliced into wafers as described above.

Figure 16A:
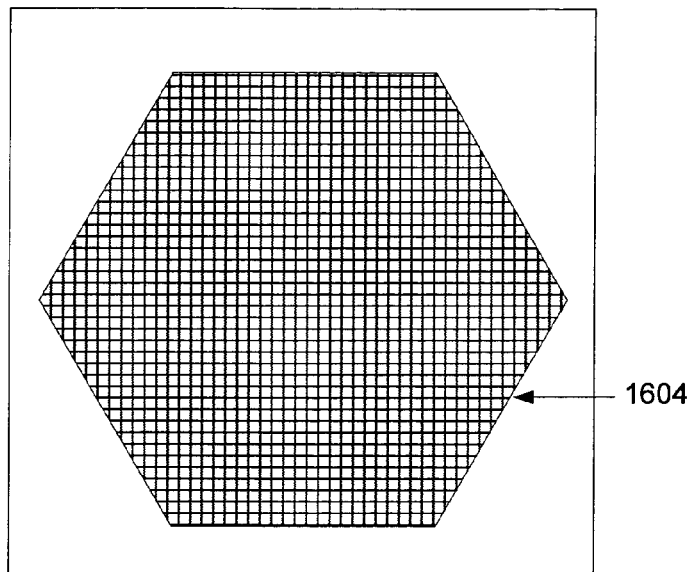
FIG. 16a shows a top view of a metal plate machined to form active zones in hexagonal array to form a planar cathode surface according to one embodiment of the invention.
Figure 16B:
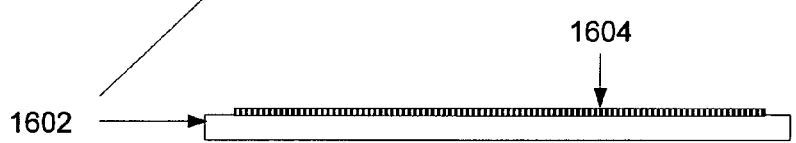
Figure 16C:
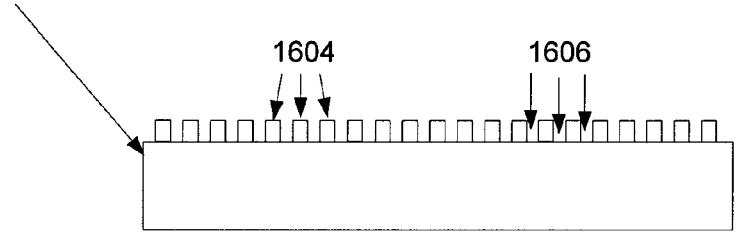
Figure 16D:
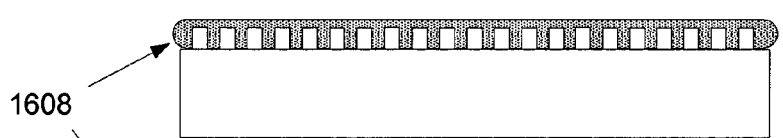
FIG. 16d shows a magnified side view of the plate of FIG. 16a after the addition of a layer of insulating material to the surface of the plate.
Figure 16E:
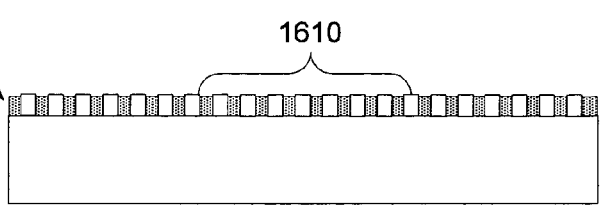
FIG. 16e shows a magnified side view of the plate of FIG. 16d after finishing the surface.

FIGS. 16a to 16c illustrate another embodiment of a method for constructing a cathode according to the invention. This method involves machining a metal plate 1602 to form a plurality of pins 1604 that protrude from the surface of plate 1602. FIG. 16a shows a top view of one example of a plate 1602 machined to form pins 1604 in a generally square array, that is, a "pegboard" pattern of pins regularly spaced in rows at right angles to columns, where each pin is separated an equal distance from adjacent pins at its top, bottom, left and right. FIG. 16b shows a side view of plate 1602. FIG. 16c is a magnified side view of a portion of plate 1602, showing pins 1604 protruding above the surface of plate 1602, and separated by gaps 1606 machined between pins 1604. In one embodiment, plate 1602 is machined mechanically. In another embodiment, plate 1602 is machined by electric discharge machining. After machining pins 1604, plate 1602 is coated with a curable insulating material 1608, as shown in the magnified side view FIG. 16d. After curing, insulating material 1608 and pins 1604 are further machined to form a smooth cathode surface 1610 having a plurality of active zones (the ends of pins 1604) separated by an insulator (cured and finished insulating material 1608). A magnified side view of the finished cathode surface 1610 is shown in FIG. 16e. In a preferred embodiment, for the production of zinc particles, the pins are machined from magnesium plate in a generally hexagonal array, and coated with a commercial epoxy sealant to form the insulator. Zinc particles deposited on a generally circular cathode may be dislodged effectively by means of the rotary scraper described above.

Figure 17D:
FIG. 17d shows a top view of a metal strip for preparing coins shown in FIG. 17c.
Figure 17E:
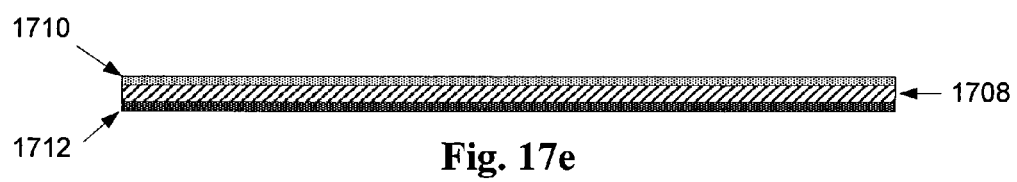
FIG. 17e shows a magnified side view of the metal strip of FIG. 17d after coatings have been applied to its top and bottom surfaces.

Another embodiment of a method for constructing a cathode according to the invention involves coining a pattern of active zones onto a metal substrate, such as magnesium. In general, a plate comprising the substrate is stamped using a closed die set configured to impress the desired active zone geometry onto the surface of the plate. The cathode surface is then coated with an insulator and finished as described in previous embodiments. FIGS. 17a to 17g illustrate an alternative embodiment of the coining method in which individual coins 1702 having active zones 1704 are produced. In this embodiment, active zones 1704 are arranged in hexagonal array. FIG. 17a illustrates a minimal number of active zones in hexagonal array, where the nearest active zones 1704 surrounding any particular active zone 1706 form a hexagonal pattern. That is, any single zone 1706 (except for zones on the perimeter of the array) is centrally spaced among six adjacent surrounding zones 1704 that are spaced equally from each other. This pattern is maintained as more zones are added to the array, as shown in FIG. 17b.

Figure 17F:
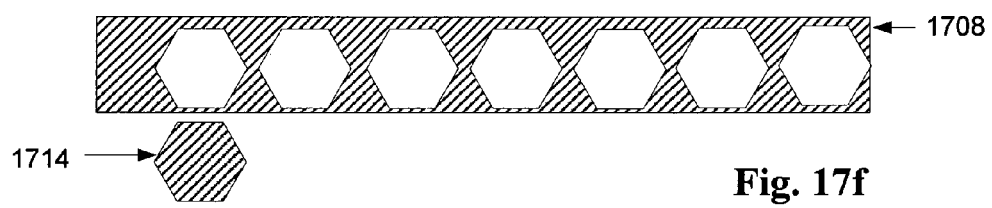
FIG. 17f illustrates the metal strip of FIG. 17d punched to form hexagonal coins of FIG. 17c.
Figure 17G:
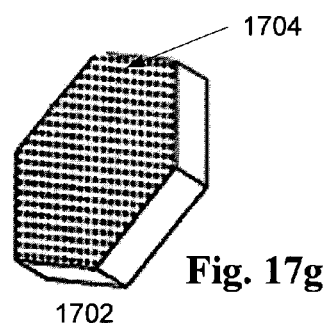
FIG. 17g depicts a hexagonal coin having a plurality of active zones stamped on its surface.
Figure 17H:
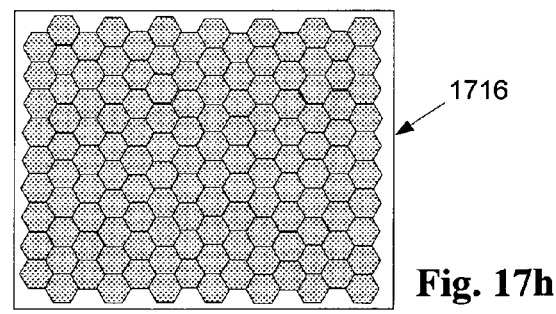
FIG. 17h illustrates a portion of a planar cathode surface configured from a plurality of hexagonal coins of FIG. 17g.

As shown in FIG. 17c, coins 1702 may generally comprise any geometric shape that can regularly divide a plane, for example, hexagonal, rectangular, or triangular shapes. Coins 1702 may be manufactured from metal stock in the form of strips 1708 having appropriate width (shown in FIG. 17d) and thickness (shown in FIG. 17e). For example, a strip 1708 may be prepared by covering one surface with a masking material 1710, and plating the opposite surface with a solderable or silver compatible metal 1712. After plating, masking material 1710 is removed, and coining blanks 1714 are punched out of the strip in a desired shape, as shown in FIG. 17f. Each coining blank 1714 is then stamped with a pattern of active zones 1704, to produce a finished coin 1702, for example, the hexagonal coin depicted in FIG. 17g. The plated sides of coins 1702 are then assembled to a conductive support plate 1716 by soldering or by means of a conductive bonding agent. When fully assembled, coins 1702 and comprise a planar cathode surface as depicted, for example, in FIG. 17h.

Figure 18A:
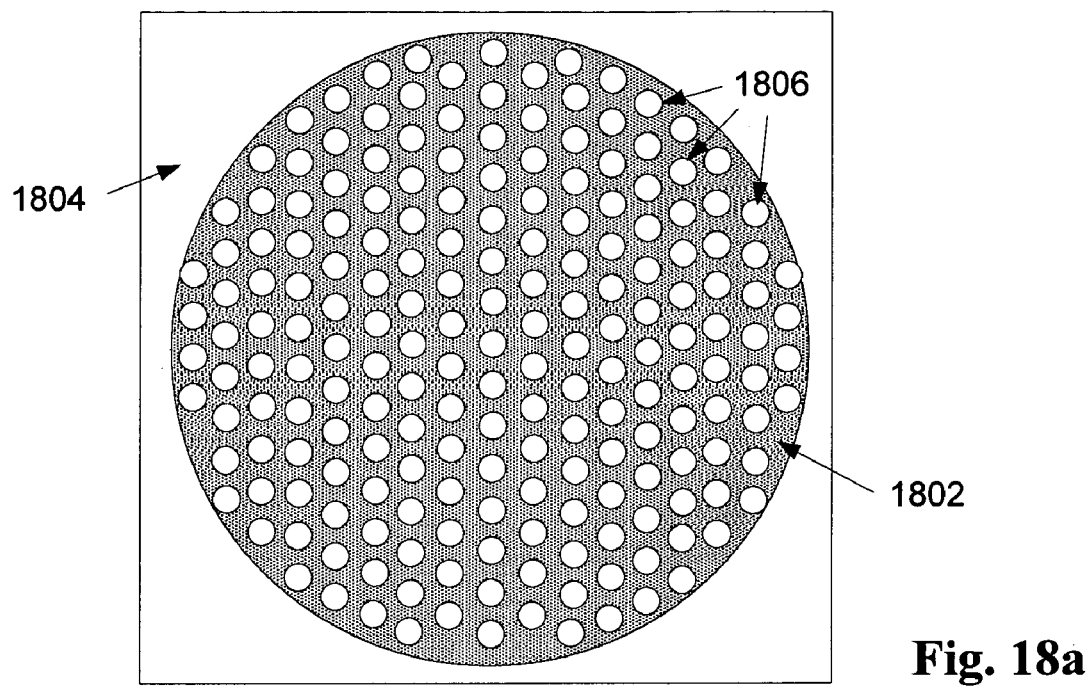
FIG. 18a shows a top view of an metal plate etched to define active zones that form a planar cathode surface according to one embodiment of the invention.
Figure 18B:
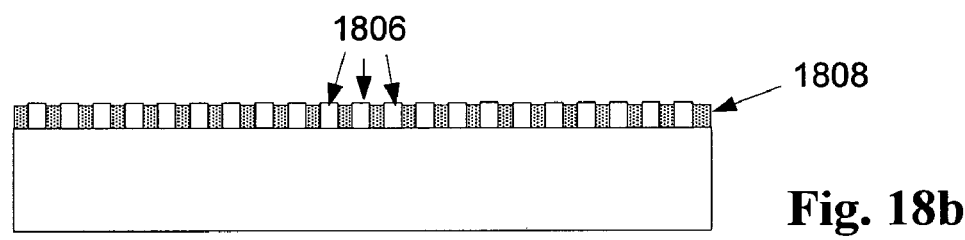
FIG. 18b shows a magnified side view of the plate of FIG. 18a after adding a layer of insulating material to the etched surface.
Figure 18C:
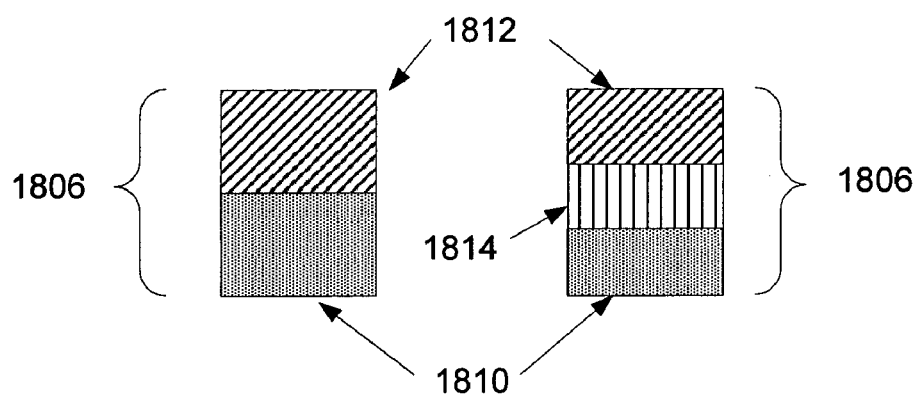
FIG. 18c shows magnified views of an active zone comprising multiple layers of metal formed according to one embodiment of the invention.

FIG. 18 illustrates another embodiment of a method for constructing a cathode according to the invention. In this method, an insulating area 1802 is chemically etched into the surface of a metal plate 1804 to define raised active zones 1806, as shown in FIG. 18a. A layer of insulating film 1808 is then added between active zones 1806, as shown in a magnified side view in FIG. 18b. In one embodiment, for the production of zinc particles, metal plate 1804 is composed of a magnesium alloy about 0.25 inch thick. By experimentation, this method yielded good results using magnesium alloy K1A having about 0.7% Zr. In another embodiment, active zones 1802 may be formed on an etched copper plate. The copper areas 1810 that form the active zones may then be plated with an additional layer of chromium 1812. Optionally, the copper may be plated first with a layer of nickel 1814, followed by a final layer of chromium 1812, as shown in FIG. 18c.

Figure 19:
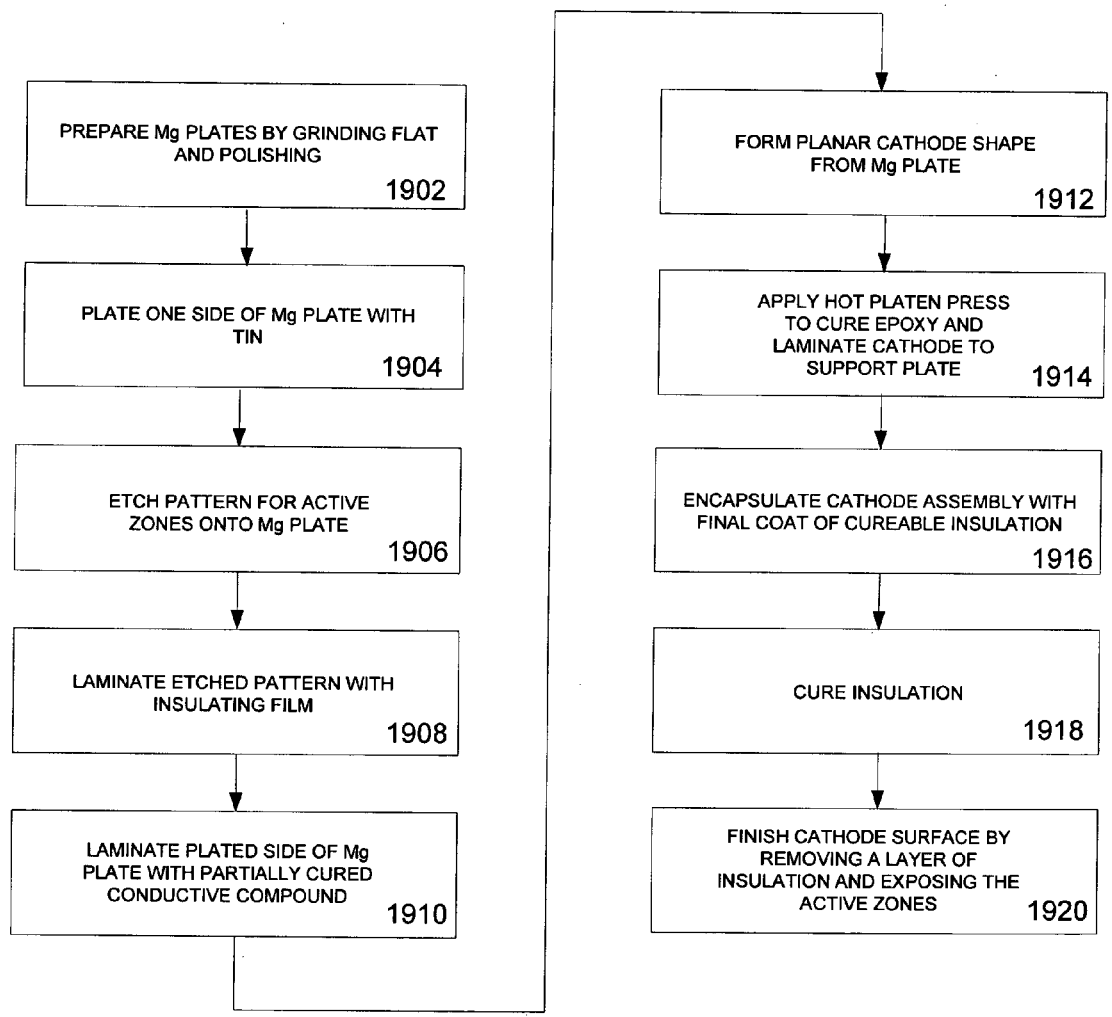
FIG. 19 is a flow chart of a method according to one embodiment of the invention of manufacturing a cathode by chemically etching a metal substrate.

A flowchart of an implementation of this method is illustrated in FIG. 19. First, in step 1902, K1A Mg plates about 310 mm square by 3 mm thick are prepared by grinding flat to a tolerance of about 0.002 in. and polishing to an 8 micro inch finish. Next, in step 1904, one side of the plate is plated with tin by any conventional plating method. The side plated is the side intended for eventual attachment to a conductive backing plate. Next, in step 1906, the desired pin pattern is etched into the surface of the Mg plate by a conventional etching technique. The pattern advantageously defines the desired geometric spacing and surface area for the active zones. In step 1908, the etched pin pattern is laminated with a coating of insulating film. In the next step, 1910, a partially cured conductive epoxy or the like is laminated to the plated side of the Mg plate. This step may optionally include attachment of a protective sheet to the laminated layer of conductive epoxy. Then in step 1912, a planar cathode is formed from the plate by punching or machining to achieve a desired cathode shape. In step 1914, a hot platen press is used to laminate the cathode form to the support plate and to fully cure the epoxy. Next, in step 1916, a final coating of curable insulation is used to encapsulate the entire assembly. The insulator is cured in step 1918. Finally, step 1920 is performed to remove a portion of the cured insulation by machining, sanding, or polishing the cathode surface to expose the active zones and finish the assembly.

Another implementation of a method of manufacturing a cathode according to the invention comprises forming active zones on a metal substrate by deposition of titanium nitride by means of chemical vapor deposition. Titanium nitride is desirable for its low surface energy which discourages other materials from bonding to it. Metal particles forming on titanium nitride by electrodeposition are therefore easily removable by application of minimal force. The substrate may be composed of any metal suitable for the purpose, for example, copper, nickel, stainless steel, magnesium, or aluminum. Active zones formed in this manner yield titanium nitride sites in the range of 0 to 1000 micrometers in height. In one embodiment, an insulating film of tantalum oxide, about 20 to 100 micrometers in height, is formed between the active zones and bonded to the substrate to complete the cathode surface.

Figure 20:
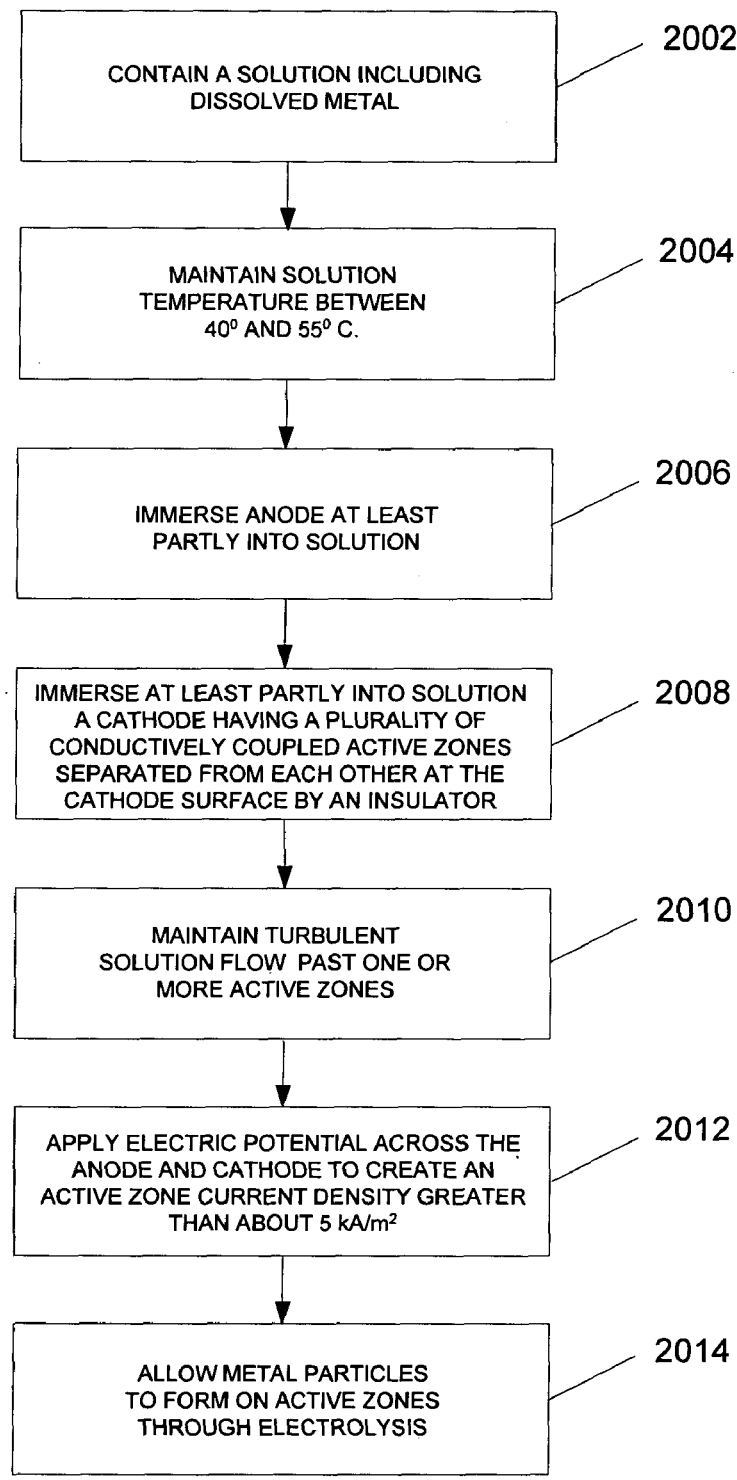
FIG. 20 illustrates an embodiment of a method according to the invention for producing metal particles.

A flowchart of an embodiment of a method of operation of a system for producing metal particles according to the invention is illustrated in FIG. 20. In step 2002, a solution including dissolved metal is contained, for example, within a container as described in any of the above figures. Next, in step 2004, the temperature of the solution is maintained between 0 and about 100 degrees C. An anode as described above is at least partially immersed in the solution in step 2006. Similarly, in step 2008, a cathode configured with one or more active zones is at least partially immersed in the solution. The cathode may comprise any of the afore-described, or similar, embodiments that is complimentary to the anode of step 2006.

With the anode and cathode immersed in solution within the container, step 2010 is performed to effect and maintain a turbulent flow of the solution past one or more active zones of the cathode. The velocity of the flow is at a level sufficient to avoid dendrite formation on the active zones. In one embodiment, the flow achieves a Reynolds number greater than about 1500. In another embodiment, the flow velocity is any velocity sufficient to produce turbulent flow that promotes good quality particle growth, i.e. non-brittle crystalline particles free of dendrite formations. In another embodiment wherein the solution comprises dissolved metal in electrolyte, the flow velocity is maintained between about 15 and about 20 gallons per minute.

Next, in step 2012, an electric potential is applied across the anode and cathode sufficient to create a current density in the active zones greater than about 5 kA/m$^2$. In one embodiment, the current density is maintained in the range between about 10 kA/m$^2$ and 40 kA/m$^2$. Through the foregoing steps, metal particles of a desired size are allowed to form on the active zones of the cathode in step 2014. In one embodiment, this step occurs by predetermining a time period which is sufficient to allow particles of a desired size to form in a particle production system according to the invention, loading the predetermined time period into a timer, and then operating a metal production system according to the invention until a time out condition is detected, at which point, particle growth is ceased.

In another embodiment of a method according to the invention, step 2002 may further comprise containing a solution having a molarity sufficient to promote good quality particle formation. For zinc particle formation from potassium zincate solution, the molarity should be in the range of about 0.1 M to about 4.5 M. In another embodiment, this step further comprises maintaining the molarity within the desired range during an entire operating cycle of the system.

Figure 21:
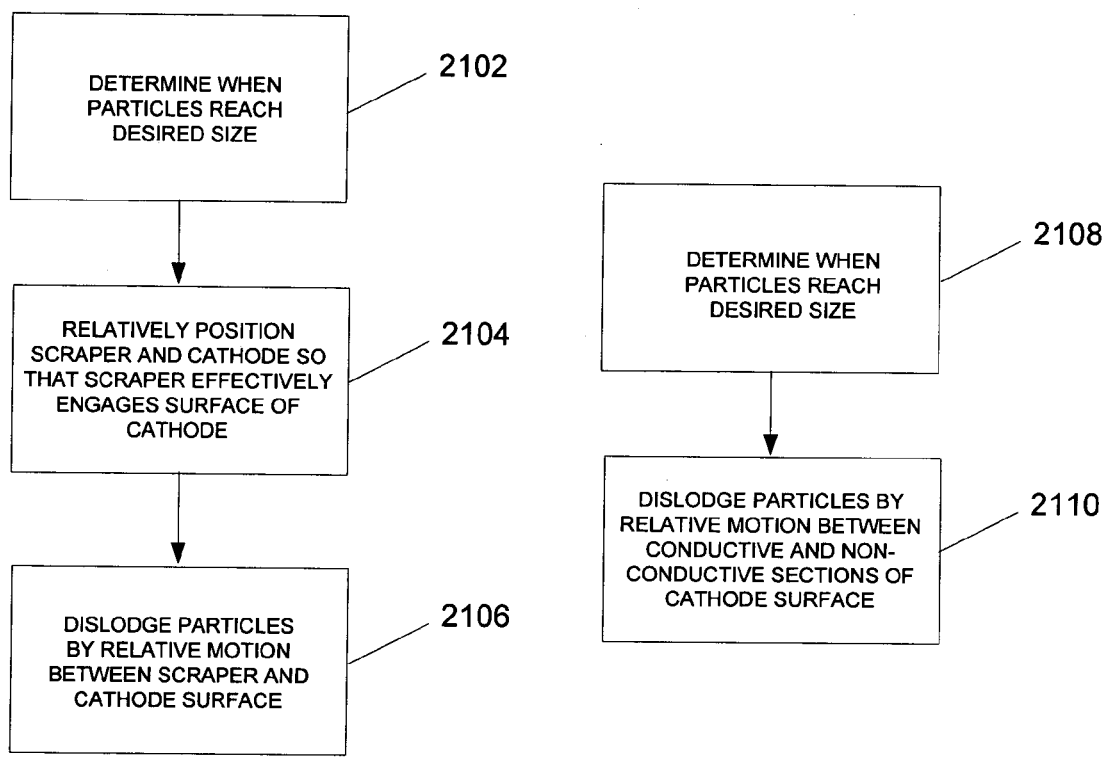
FIG. 21a illustrates an embodiment of a method according to the invention for removing particles from a cathode.
FIG. 21b illustrates a second embodiment of a method according to the invention for removing particles from a cathode.

FIG. 21a is a flowchart of an embodiment of a method according to the invention for removing metal particles from the active zones of a cathode by scraping. In step 2102, it s determined when the particles have grown to a desired size. In one implementation, this can be accomplished visually, or by expiration of a time out condition as previously discussed. Next, step 2104 is performed. In step 2104, the scraper and cathode are relatively positioned so that the scraper effectively engages the surface of the cathode for purposes of particle removal. This step may be accomplished by positioning a cathode relative to a stationary scraper, by positioning a scraper relative to a stationary cathode, or both. Step 2106 then occurs. In step 2106, the particles are dislodged by relative motion between the scraper and the cathode surface.

FIG. 21b is a flowchart of a second embodiment of a method according to the invention for removing particles from the cathode surface. This embodiment is applicable to a cathode in which the non-conductive material forms a perforated layer of insulation on the surface of the conductive material, and in which relative motion between the cathode conductive material and the conductive material is permitted. In step 2108, it is determined whether metal particles of a desired size have grown. Again, in one implementation, this step may occur through visual observation and through detection of a time out condition. Step 2108 is followed by step 2110. In step 2110, the particles are dislodged by relative motion between the conductive and non-conductive portions of the cathode surface.

Referring again to FIGS. 21a and 21b, other embodiments of a method according to the invention may further comprise additional steps for directing the particles dislodged in either step 2106 or 2110 into a collection area. One such embodiment comprises directing the particles by entraining them within a flow of the solution. Another embodiment comprises directing the dislodged particles by means of gravity. In either of these methods, the dislodged particles may then be collected or allowed to accumulate in a collection area, and eventually recovered for transport to a storage device or injected directly into a metal/air fuel cell thereby recharging the cell.

The various apparatus and methods presented throughout the foregoing discussion provide means for producing metal particles under controlled conditions. Operating systems such as those shown in FIGS. 1, 5 and 11 may yield high quality metal particles provided that parameters such as flow velocity, current density, temperature, and concentration are maintained within predetermined limits. In these systems where a single tank contains the electrolyte, the reaction products, the electrolyzer, and the metal particles, parameters such as the concentration of the dissolved metal and the temperature of the electrolyte can be difficult to control because they tend to vary widely during normal periods of system operation. For example, during normal operation of a zinc production system using KOH electrolyte, zincate concentration may range from 0.5M to 4.0M. Under the same conditions, the temperature of the electrolyte may range from ambient to 65 degrees C. Thus, in order for a system according to the invention to optimize its yield of high quality particles, additional system controls may be necessary to maintain the temperature and concentration within preferred ranges during system operation.

Figure 22:
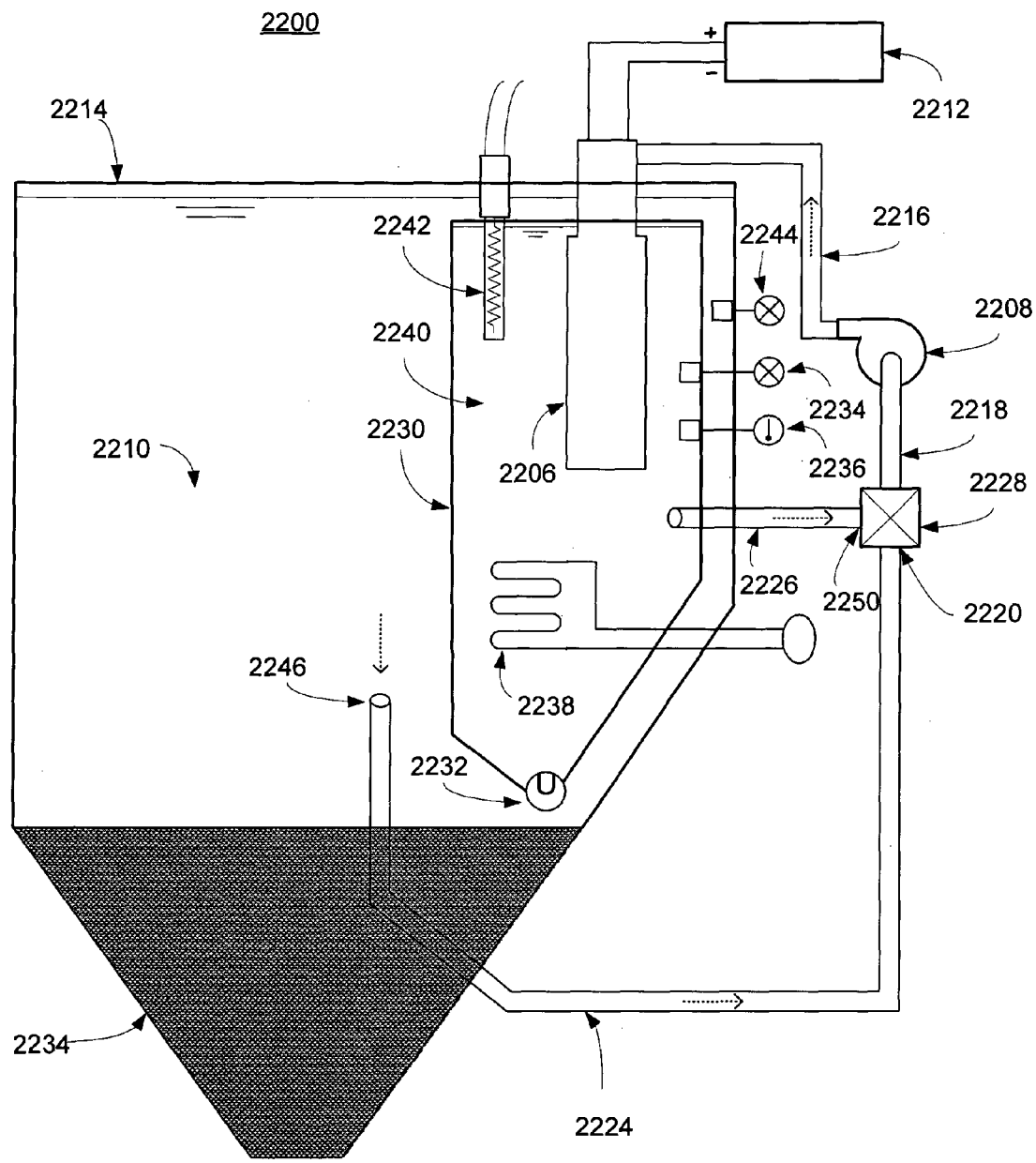
FIG. 22 illustrates an embodiment of a system according to the invention for controlling concentration of an electrolyte during electrolysis.

FIG. 22 illustrates an embodiment of the present invention for controlling the temperature and concentration of electrolyte solution during electrolysis. A first container 2214 is filled with an electrolyte solution 2210 that contains a dissolved metal. The solution may be composed as in other embodiments previously described, for example, zincate dissolved in KOH. A second container 2230 is located within first container 2214 and is filled with a second body 2240 of electrolyte solution 2210. Second container 2230 houses a discrete particle electrolyzer 2206 according to any of the various embodiments of electrolyzers previously disclosed. Second container 2230 is in fluid communication with first container 2214 through a circuit comprising inlet conduit 2224, tempering valve 2228, conduit 2218, pump 2208, conduit 2216, electrolyzer 2206, and outlet valve 2232. Outlet valve 2232 may also comprise a check valve to prevent back flow of solution 2210 into container 2230. Tempering valve 2228 is configured with first inlet port 2220, connecting to container 2214 through pipeline 2224, and second inlet port 2250, connecting to container 2230 through pipeline 2226. In addition, second container 2230 is configured with a means 2234 for sensing the dissolved metal concentration of solution 2240. Sensing means 2234 may be any conventional instrument capable of outputting a signal representative of a concentration of a dissolved compound. First container 2214 is optionally configured with a similar means 2244 for sensing the dissolved metal concentration of solution 2210.

Metal particle production in system 2200 occurs within container 2230. When the concentration of interest, i.e. the concentration of dissolved metal in solution 2240, is within a predetermined range (i.e. above a low concentration set point and below a high-concentration set point), system 2200 operates in closed-container mode. In closed-container mode, outlet valve 2232 and tempering valve 2228 isolate container 2230 from container 2214. Isolation of container 2230 is accomplished responsive to a high concentration sensed by sensing means 2234, where the sensed concentration exceeds a high-concentration set point or otherwise falls within a predetermined or preferred range. Under this circumstance, outlet valve 2232 closes, and tempering valve 2228 closes inlet port 2220 while maintaining inlet port 2250 at least partially open. Pump 2208 may then circulate solution 2240 through electrolyzer 2206 into container 2230, via pipelines 2226, 2218, and 2216. Electrolyzer 2206 is then energized by power supply 2212 to initiate a process of forming metal particles, as previously described. After each growth cycle, metal particles are removed from the electrolyzer by any of the means previously disclosed. Particles that accumulate in the bottom portion of container 2230 may then be transferred, e.g. by gravity, to hopper 2234 of container 2214 by opening outlet valve 2232 as necessary. The next growth cycle in closed-container mode may then commence after reclosure of outlet valve 2232.

Initially, the molarities of bodies 2210 and 2240 are identical, having been supplied from a common external source. After one or more growth cycles in closed-container mode, the concentration of solution 2240 will decrease as metal particles are extracted from the electrolyte thereby reducing the concentration of dissolved metal in solution 2240. When the concentration of interest is outside of a predetermined range (i.e. below a low concentration set point), system 2200 operates in open-container mode. In this mode, outlet valve 2232 and tempering valve 2228 each change position to establish fluid communication between container 2230 and container 2214. This is accomplished responsive to a low concentration sensed by sensing means 2234, whereby outlet valve 2232 changes to a position at least partially open, and tempering valve 2228 changes the position of inlet port 2220 to at least partially open. Pump 2208 may then replenish solution 2240 by drawing a supply of solution 2210 from first container 2214 into inlet 2246. Thereby, pump 2208 causes solution 2210 to flow through pipelines 2224, 2218, and 2216, through electrolyzer 2206, and into container 2230 to mix with solution 2240. Thus, during a transition between closed-container mode and open-container mode, electrolyzer 2206 may operate continuously.

Tempering valve 2228 allows a supply of higher concentration solution 2210 to be mixed, or exchanged, with second body solution 2240. As mixing begins, the concentration of solution 2240 will desirably begin to rise, as lower concentration solution is exchanged for higher concentration solution. In system 2200, the rate at which solution 2240 is exchanged for solution 2210 may be varied according to the position of tempering valve 2228. Adjusting the position of tempering valve 2228 determines the ratio of the flows through inlet ports 2220 and 2250, and therefore controls the rate of exchange. One skilled in the art will recognize that the positions of tempering valve 2228 may be finely adjusted responsive to the concentration sensed by sensing means 2234 in order to achieve a desired transfer characteristic for controlling concentration. In one embodiment, after system 2200 begins operating in open-container mode, the system continues to operate in open-container mode as long as a sufficient volume of higher-concentration solution 2210 is available to maintain the concentration of solution 2240 within the preferred range. When the concentration of solution 2210, as sensed by means 2244, reaches a predetermined value, e.g. a value at or below the sensed concentration of solution 2240, system operation may be halted. At this time, metal particles that have accumulated in hopper 2234 may be harvested from the system, and solution 2210 may be replenished from an external source.

As previously discussed, the temperature of solution 2240 must be maintained within the preferred range between about 40 and about 55 degrees C. to optimize particle quality. During start-up of system 2200, the ambient temperature of solution 2240 is typically well below this range. After continued operation of system 2200, the temperature of solution 2240 will tend to rise above this range as energy is transferred into the system via pump 2208 and power supply 2212. Thus, in order to maintain the temperature of solution 2240 within the preferred range, system 2200 may be configured with a means 2238 for cooling, a means 2242 for heating, and a means 2236 for sensing the temperature of, solution 2240. Sensing means 2236 may be any conventional temperature-sensing instrument capable of outputting a signal representative of the sensed temperature. Similarly, conventional devices for cooling and heating fluids may comprise means 2238 and means 2242, respectively. For example, cooling means 2238 may comprise a refrigerant passing through cooling coils at least partially immersed within solution 2240, and heating means 2242 may comprise an insulated resistive heating element at least partially immersed within solution 2240. During operation of system 2200, when sensor 2236 senses a temperature below a low-temperature set point, heating means 2242 turns on, thereby warming solution 2240. When the sensed temperature of solution 2240 heats up to a predetermined value within the preferred operating range, heating means 2242 is switched off. When sensor 2236 senses a temperature above a high-temperature set point, cooling means 2238 turns on, thereby cooling solution 2240. When the sensed temperature of solution 2240 cools down to a predetermined value within the preferred range, cooling means 2238 turns off. In another embodiment, during start-up from ambient temperature, an interlock (not shown) responsive to temperature sensor 2236 may prevent energization of electrolyzer 2206 until a desired operating temperature is achieved. Thus, the temperature of solution 2240 is maintained within the preferred range whenever electrolyzer 2206 is energized and growing metal particles.

In another embodiment of the invention, a system configured similarly to system 2200 may control temperature of solution 2240 by exchanging with solution 2210. This method may be employed to transition system 2200 from operating in closed-container mode to open container mode as described above, but in response to sensed temperature rather than sensed concentration. That is, when sensor 2236 senses a temperature above a high-temperature set point, outlet valve 2232 and inlet port 2220 respond by opening fluid communication between containers 2214 and 2230. Accordingly, solutions 2210 and 2240 are mixed, and system 2200 continues to operate in open-container mode until the temperature of body 2240 is cooled down to a predetermined value within the preferred range. At this point, system 2200 may return to closed-container mode, absent a contrary control signal from concentration sensing means 2234. Other embodiments of a system according to the invention may include any combination of the aforedescribed heating, cooling, and exchanging methods for temperature control.

Figure 23:
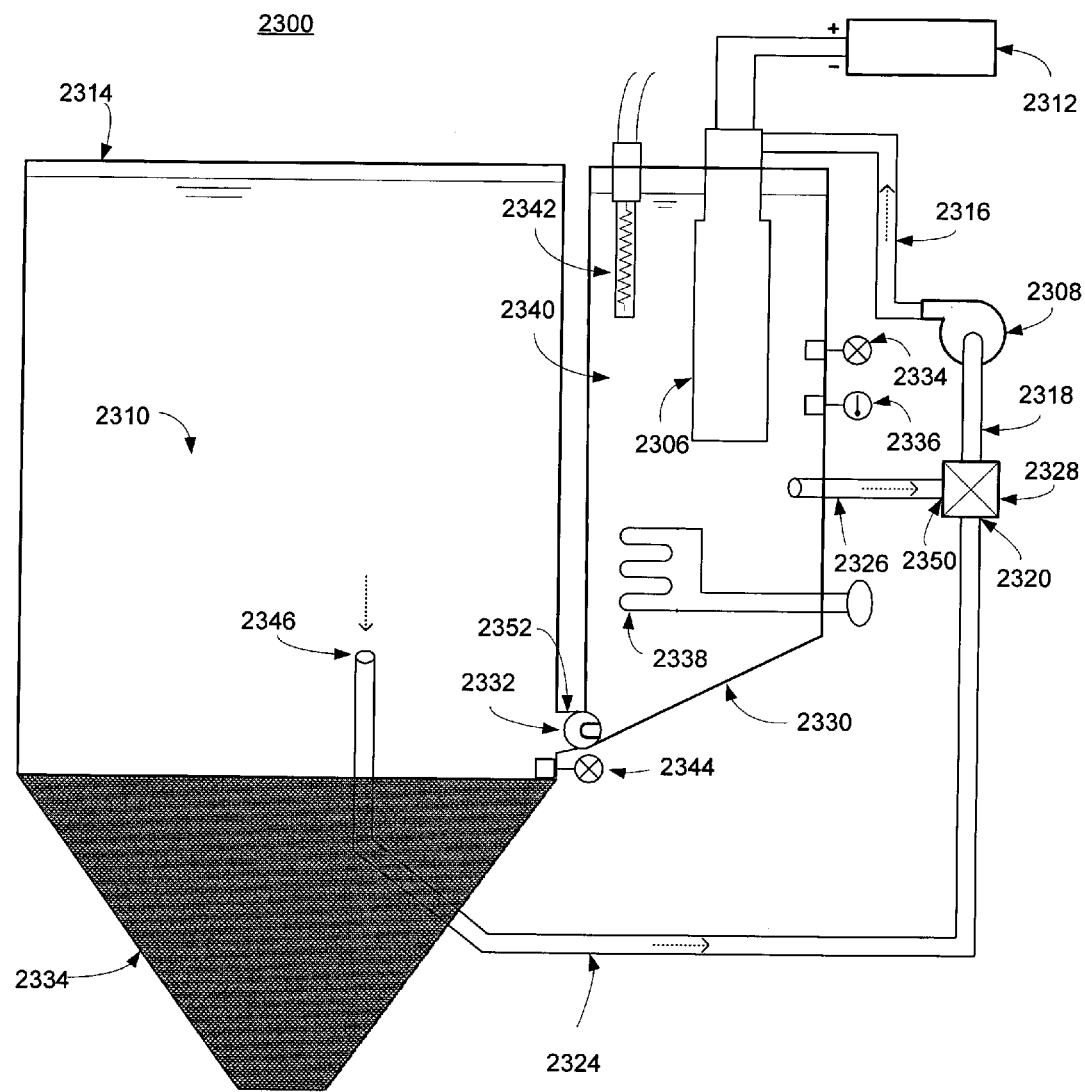
FIG. 23 illustrates another embodiment of a system for controlling concentration of an electrolyte having a second container located externally to a first container.

FIG. 23 illustrates another embodiment of a system 2300 for controlling concentration and temperature of an electrolyte solution during electrolysis. System 2300 is identical in most respects to system 2200, except that system 2300 is configured with second container 2330 located externally to first container 2314. Also, fluid communication from second container 2330 into first container 2314 requires an additional length of conduit 2352 to allow for the flow of solution 2340 into container 2314 and/or metal particles into hopper 2334. Although second container 2330 is depicted proportionately smaller than first container 2314, skilled artisans will recognize that in other implementations, second container 2330 may be equal in size or larger than, first container 2314. Moreover, the proportion of a volume of solution 2340 in first container 2314 to a volume of solution 2340 in second container 2330 may be less than, equal to, or greater than unity. Operation of system 2300 is otherwise identical to that discussed for system 2200. Numerical references for components of system 2200 correspond to the same components of system 2300.

In other embodiments, the function of one or more of valves 2228, 2232, 2328, and 2332 may be accomplished by means of a pump in lieu of a valve. For example, referring again to FIG. 22, valve 2228 and pipeline 2218 may be eliminated from the system and a pump 2208 having two inlet ports may be coupled directly to pipelines 2224 and 2226. Optionally, pump 2208 may comprise a dual inlet pump having valved inlets capable of mixing fluids drawn from pipelines 2224 and 2226 in different ratios. Similarly, the function of outlet valve 2232 or 2322 may be accomplished by switching a pump on or off when changing between open-container mode and closed-container mode.

Figure 24:
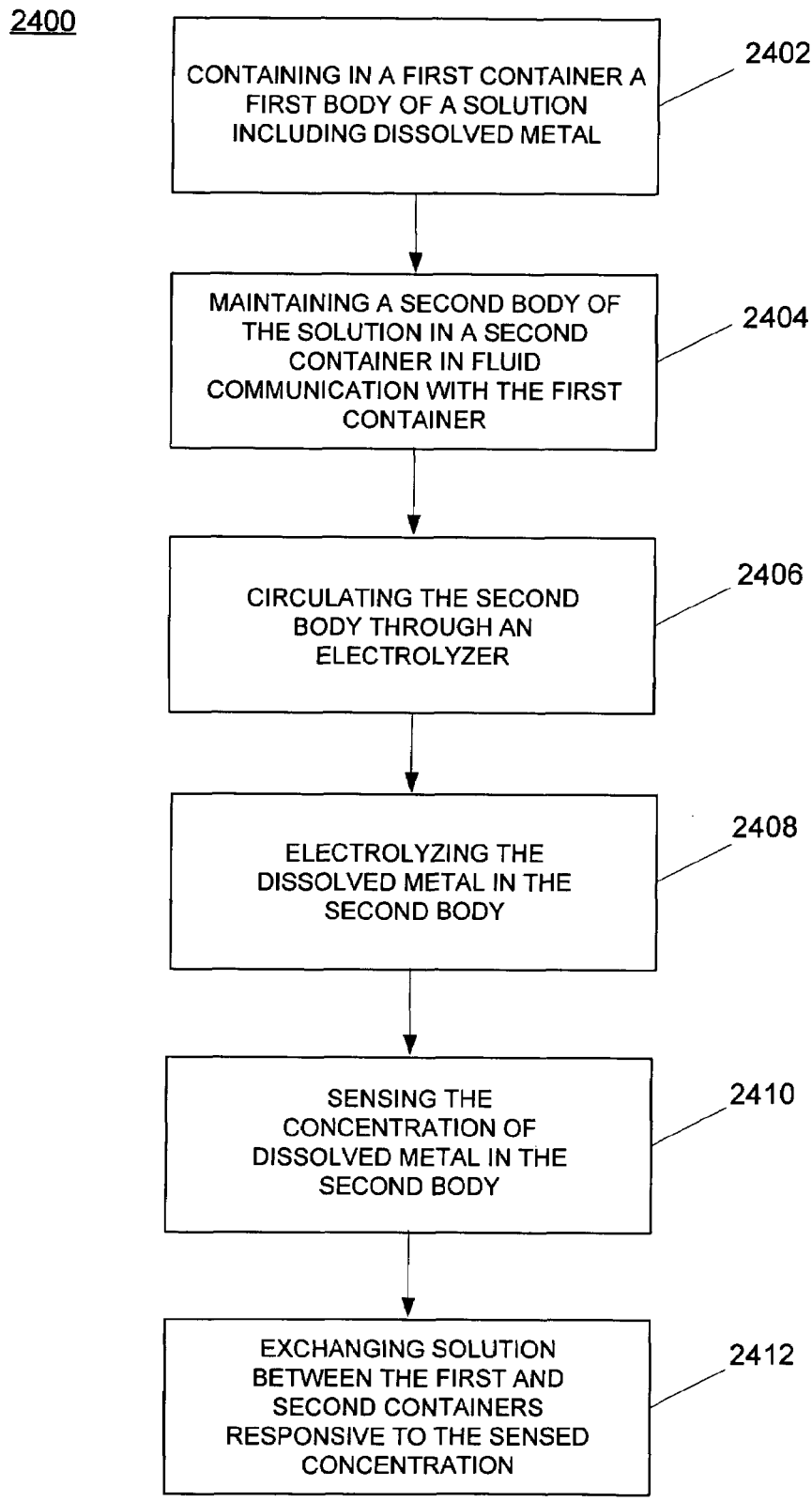
FIG. 24 illustrates an embodiment of a method according to the invention for controlling concentration of an electrolyte during electrolysis.

One embodiment of a method according to the invention for controlling concentration of an electrolyte during electrolysis is depicted in FIG. 24. The process begins at step 2402 by containing a body of solution including dissolved metal within a first container as described in FIG. 22 or FIG. 23. Next, in step 2404, a second body of the same solution contained in the first container is maintained in a second container. The second container is configured to be in fluid communication with the first container, as described in the two previous Figures. In step 2406, the second body of solution is circulated through an electrolyzer. The electrolyzer may comprise any of the embodiments discussed above, for example, the discrete particle electrolyzer apparatus shown in FIG. 10. Next, in step 2408, a portion of the dissolved metal of the second body of solution is electrolyzed in the electrolyzer to begin the metal particle production process. As particles are produced, the concentration of the dissolved metal changes. In the next step, 2410, the concentration of the dissolved metal is sensed by a sensing means. Responsive to the sensed concentration, step 2412 is performed, in which solution is exchanged between the first and second containers, thereby maintaining the dissolved metal concentration of the second body within a preferred operating range.

Figure 25A:
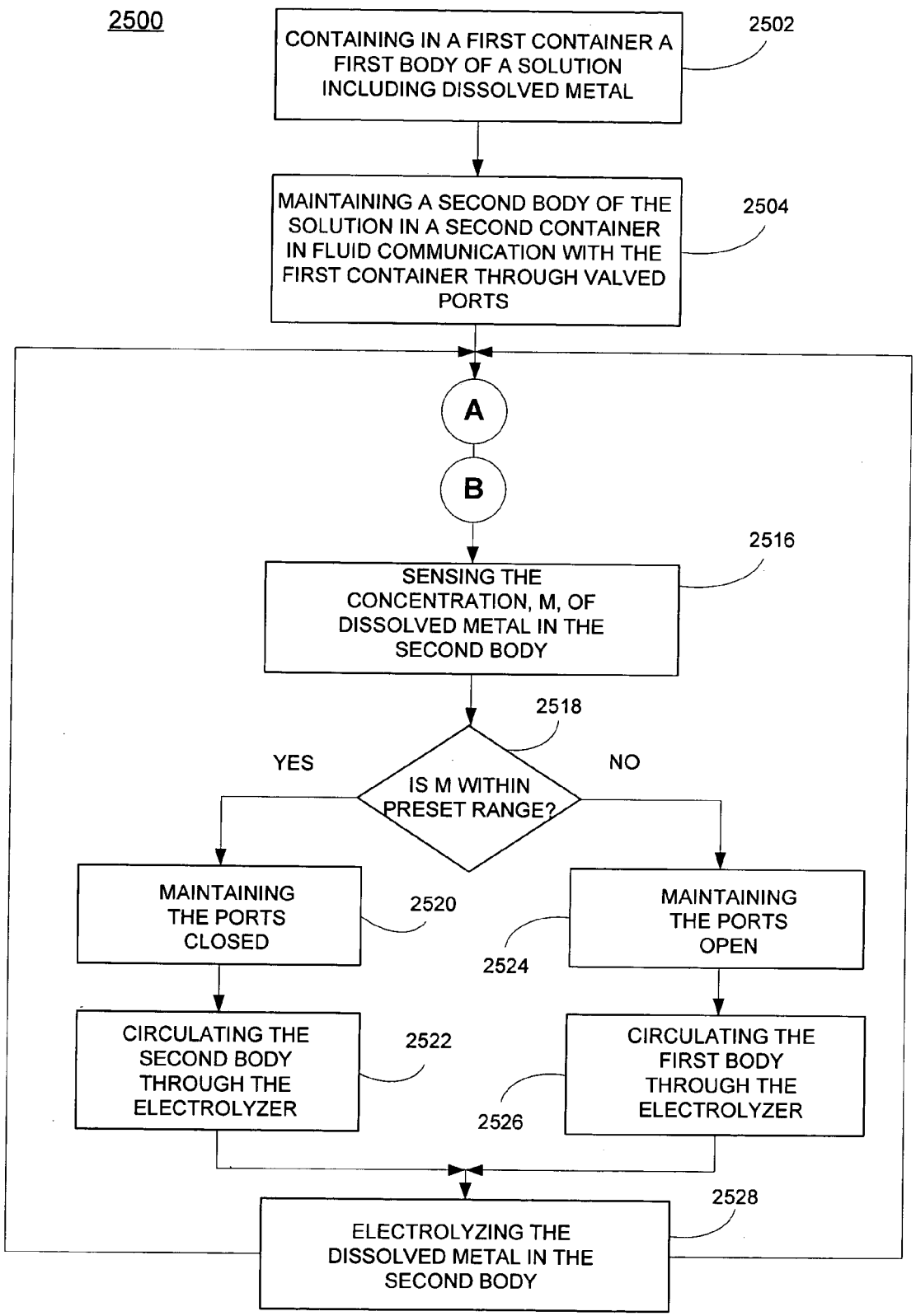
FIG. 25a is a flow chart of a method according to one embodiment of the invention for controlling concentration of an electrolyte during electrolysis.

FIG. 25a illustrates another embodiment of a method 2500 according to the invention in the form of a flow chart for operating a controlled concentration electrolysis system. This method applies to systems having valved ports that may open or close fluid communication between first and second containers, such as those shown in FIGS. 22 and 23. The method begins at step 2502, by containing in a first container a solution including dissolved metal. Next, in step 2504, a second body of the solution contained in the first container is maintained in a second container. The second container is configured for fluid communication with the first container through valved ports. The next step in this method is step 2516 (optional nodes A and B are ignored). In step 2516, a concentration value, M, of the dissolved metal in the second body is sensed by a sensing means. Next, the logical decision block of step 2518 is executed. If concentration M sensed in step 2516 is within a predetermined concentration range, e.g., the preferred range of concentration for producing quality particles, then the method proceeds to the branch beginning with step 2520. In step 2520, the valved ports are maintained closed, thereby isolating the second container and enabling operation in closed-container mode. Next, in step 2522, the second body of solution is circulated through the electrolyzer, which may comprise any of the embodiments of discrete particle electrolyzers previously discussed. However, if concentration M sensed in step 2516 is outside of a predetermined concentration range, then the method proceeds to the branch beginning with step 2524. In step 2524, the valved ports are maintained open, thereby restoring fluid communication between the containers and enabling operation in open-container mode. Next, in step 2526, solution from the first container is circulated through the electrolyzer. Step 2528 is the final step for either branch. In step 2528, the dissolved metal in the circulating solution is electrolyzed by applying appropriate energy to the electrolyzer. The method then loops back to step 2516 for continuing operation.

Figure 25B:
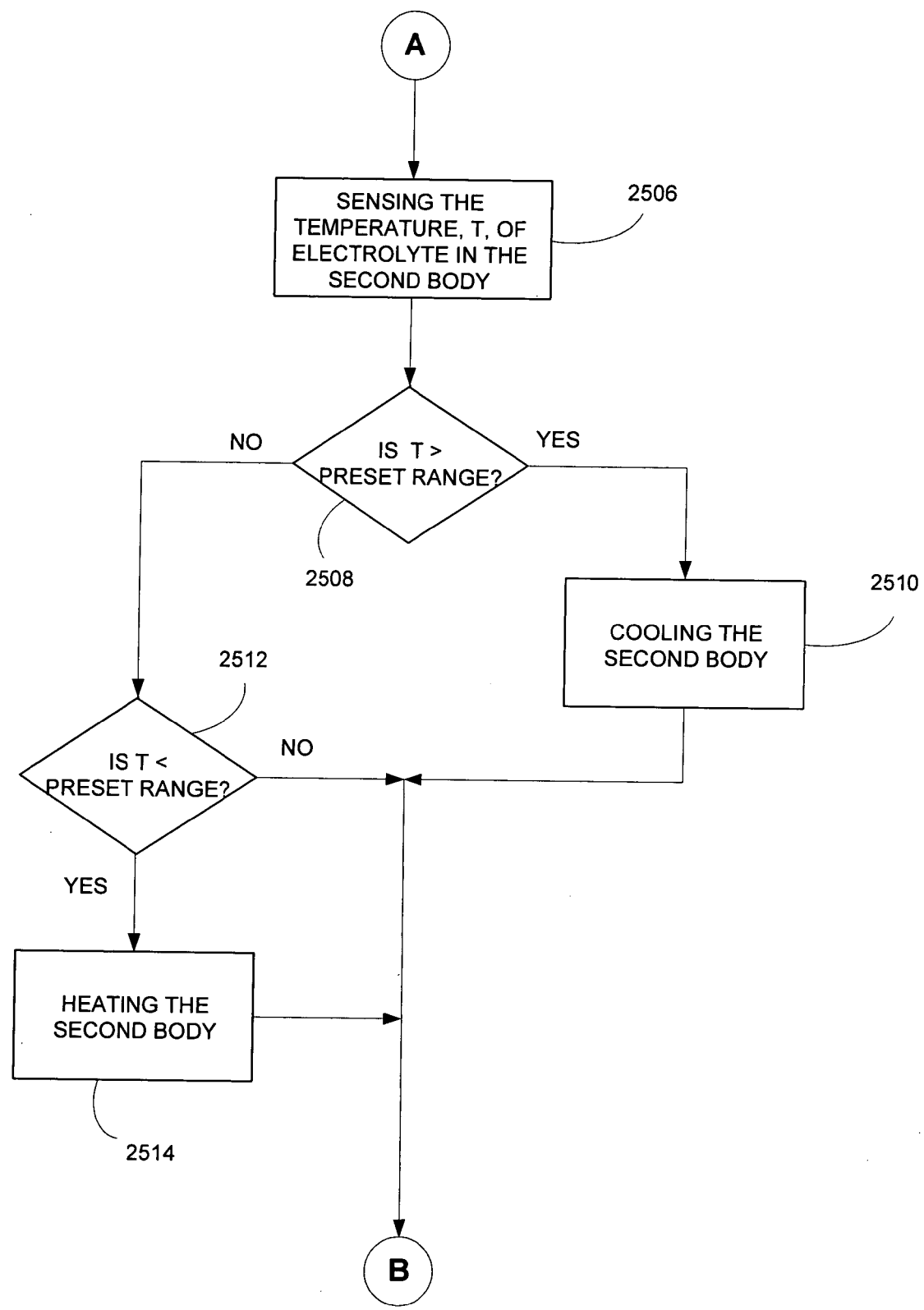
FIG. 25b shows additional steps for the flow chart of FIG. 25a for controlling temperature of an electrolyte during electrolysis.

FIG. 25b illustrates another embodiment of method 2500. The method of FIG. 25b comprises method 2500, plus additional steps for controlling temperature of electrolyte during electrolysis. Referring again to FIG. 25a, the method begins at step 2502, and proceeds to step 2504. These steps are executed identically as previously described. Next, the method executes the steps between nodes A and B which are shown on the flow chart of FIG. 25b. At step 2506, a temperature value, T, of the electrolyte comprising the second body is sensed by a temperature sensor. Next, the logical decision block of step 2508 is executed. If temperature T sensed in step 2516 is above a predetermined temperature range, e.g., the preferred range of temperature for producing quality particles, then the method proceeds to step 2520. In step 2520, the second body is cooled by initiating a cooling process, for example, by circulating a reflidgerant through cooling coils immersed in the solution. The method then proceeds to step 2516. However, if temperature T is not above the predetermined range, then the method proceeds to step 2512, where another logical decision block is executed. If temperature T is below the predetermined range, the method proceeds to block 2514. In step 2514, the second body is heated by a heating process, for example, a resistive heating element immersed in the solution. The method then proceeds to step 2516. However, if temperature T is not below the predetermined range, then the method proceeds directly to step 2516. The steps of method 2500 are then continued beginning at step 2516, as previously described.

From the foregoing, it will be seen that embodiments of the invention are possible in which particles are produced having a size that is related to the size of the surface area of the active zones of a cathode. This factor in turn promotes consistent production of particles within a predetermined size range. In addition, embodiments are possible in which 1) the particles which are produced can be used directly in a metal/air fuel cell without first having to sort the particles by size; 2) seed particles are not required to initiate particle growth; 3) operation thereof occurs at high current densities, thereby enabling construction of a compact, efficient device with a high rate of particle output; 4) operation thereof occurs at high current density and high liquid flow rate, thereby producing high quality crystalline metal particles over a wide range of reaction solution/dissolved metal concentrations; or 5) the metal particles that are produced are coherent and mechanically strong but also of low density and high surface area and therefore of high electrochemical reactivity.

Skilled artisans will appreciate that the aforedescribed method is not limited to the recovery of zinc from alkaline solution. By appropriately adjusting the various process parameters, the method may be exploited for the recovery of other metals, for example, magnesium, aluminum, calcium, nickel, copper, cadmium, tin, or lead dissolved in a suitable electrolytic solvent.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for maintaining a concentration range of an electroreducible metal species during electrolysis, comprising:
    containing in a first container a first body of a solution including dissolved metal;
    maintaining a second body of the solution in a second container, the dissolved metal of the second body having a concentration;
    isolating the second container from the first container;
    circulating the second body at a turbulent flow velocity through an electrolyzer in a first circulation loop;
    electrolyzing a portion of the dissolved metal of the second body in the electrolyzer;
    sensing the concentration; and
    responsive to the sensed concentration,
    opening one or more flow paths between the second container and the first container, and
    circulating a portion of the first body and a portion of the second body at a turbulent flow velocity through the electrolyzer in a second circulation loop.

2. The method of claim 1 further comprising maintaining a temperature of the second body within a predetermined range.

3. The method of claim 2 wherein the range is between about 25 degrees and about 65 degrees C.

4. The method of claim 2 wherein the range is between about 40 degrees and about 55 degrees C.

5. The method of claim 2 further comprising sensing the temperature of the second body, and wherein the maintaining step comprises exchanging the solution responsive to the sensed temperature.

6. The method of claim 5 wherein the maintaining step comprises heating the second body responsive to the sensed temperature.

7. The method of claim 5 wherein the maintaining step comprises cooling the second body responsive to the sensed temperature.

8. The method of claim 2 further comprising maintaining the temperature by immersing a cooling coil at least partially within the second body.

9. The method of claim 2 further comprising maintaining the temperature by immersing a heating element at least partially within the second body.

10. The method of claim 1 wherein the first circulating step further comprises circulating the second body through the electrolyzer by means of a pump.

11. The method of claim 10 wherein the second circulating step further comprises circulating the second body between the first container and the pump, and between the pump and the second container.

12. The method of claim 10 wherein the second circulating step further comprises circulating the solution to the pump through a tempering valve having first and second valve inlets, the first valve inlet in fluid communication with the first container and the second valve inlet in fluid communication with the second container.

13. The method of claim 1 wherein the second circulating step further comprises returning the solution from the second container to the first container by means of an outlet valve.

14. The method of claim 1 wherein the dissolved metal is in a form of one or more oxides of the metal.

15. The method of claim 1 wherein the solution comprises a reaction product of an electrochemical reaction in a metal/air fuel cell.

16. The method of claim 1 wherein the dissolved metal is zinc.

17. The method of claim 1 wherein the solution comprises an aqueous solution.

18. The method of claim 17 wherein the aqueous solution comprises dissolved electrolyte and a suspension of metal oxide.

19. The method of claim 1 wherein the second circulating step maintains the concentration between about 0.5M and 4.0M.

20. The method of claim 1 wherein the second circulating step maintains the concentration between about 1.0M and 2.5M.

21. A method for maintaining a concentration range of an electroreducible metal species during electrolysis, comprising:

containing in a first container a first body of a solution including dissolved metal;

maintaining a second body of the solution in a second container in fluid communication with the first container through valved ports, the dissolved metal of the second body having a concentration;

circulating the second body at a turbulent flow velocity through an electrolyzer in a first circulation loop;

electrolyzing metal in the second body in the electrolyzer;

sensing the concentration; and if the sensed concentration falls outside of a predetermined range,
   opening the ports; and
   circulating the first body at a turbulent flow velocity through the electrolyzer in a second circulation loop.

22. The method of claim 21 further comprising maintaining a temperature of the second body within a predetermined range.

23. The method of claim 22 wherein the range is between about 25 degrees and about 65 degrees C.

24. The method of claim 22 wherein the range is between about 40 degrees and about 55 degrees C.

25. The method of claim 21 further comprising sensing a temperature of the second body, and
   if the sensed temperature falls outside of a predetermined range,
      opening the ports; and
      circulating the first body at a turbulent flow velocity through the electrolyzer in the second circulation loop.

26. The method of claim 25 wherein the maintaining step comprises heating the second body responsive to the sensed temperature.

27. The method of claim 25 wherein the maintaining step comprises cooling the second body responsive to the sensed temperature.

28. A method for maintaining a concentration range of an electroreducible metal species during electrolysis, comprising:

containing in a first container a first body of a solution including dissolved metal;

maintaining a second body of the solution in a second container, the dissolved metal of the second body having a concentration;

isolating the second container from the first container;

circulating the second body at a turbulent flow velocity through an electrolyzer in a first circulation loop;

electrolyzing a portion of the dissolved metal of the second body in the electrolyzer;

sensing the concentration; and if the sensed concentration drops below a low-concentration set point,
   opening one or more flow paths between the second container and the first container, and
   circulating a portion of the first body and a portion of the second body at a turbulent flow velocity through the electrolyzer in a second circulation loop;

if the sensed concentration exceeds a high-concentration set point,
   closing the one or more opened flow paths between the second container and the first container, and
   circulating the second body at a turbulent flow velocity through the electrolyzer in the first circulation loop.

* * * * *